United States Patent [19]

Barriquand et al.

[11] Patent Number: 4,884,418
[45] Date of Patent: Dec. 5, 1989

[54] INSTALLATION FOR THE WET TREATMENT OF TEXTILE MATERIALS DISPOSED ON MATERIAL CARRIERS

[75] Inventors: Bernard Barriquand; Francois Villard; Bernard Durantet, all of Roanne, France

[73] Assignee: Barriquand, Roanne, France

[21] Appl. No.: 138,716

[22] Filed: Dec. 28, 1987

[30] Foreign Application Priority Data

Dec. 30, 1986 [FR] France .................. 86 18338
Jan. 22, 1987 [FR] France .................. 87 00733
Mar. 12, 1987 [FR] France .................. 87 03382

[51] Int. Cl.$^4$ .................................. D06B 5/16
[52] U.S. Cl. ........................... 68/150; 68/184; 68/189; 68/129
[58] Field of Search ............... 68/184, 189, 187, 198, 68/199, 150, 7; 8/155.1

[56] References Cited

U.S. PATENT DOCUMENTS

| | | | |
|---|---|---|---|
| 2,553,106 | 5/1951 | Naumann | 68/198 |
| 3,344,622 | 10/1967 | Kronsbien | 68/199 X |
| 3,695,827 | 10/1972 | Byrd | 68/189 X |
| 3,964,278 | 6/1976 | Korsen et al. | 68/150 X |
| 4,452,055 | 6/1984 | Lejune et al. | 68/189 |

FOREIGN PATENT DOCUMENTS

| | | |
|---|---|---|
| 0110058 | 6/1984 | European Pat. Off. . |
| 0225246 | 6/1987 | European Pat. Off. . |
| 501677 | 4/1920 | France .................. 68/189 |
| 547834 | 12/1926 | France .................. 68/189 |
| 2427417 | 12/1979 | France . |
| 2429283 | 1/1980 | France . |
| 2580004 | 10/1986 | France . |
| 2062036 | 5/1981 | United Kingdom . |

Primary Examiner—Frankie L. Stinson
Attorney, Agent, or Firm—Cushman, Darby & Cushman

[57] ABSTRACT

An installation is provided for the wet treatment of textile materials disposed on material-carriers, comprising a tank with means for loading or unloading the material-carriers, a means for causing the treatment fluid to flow through said materials and, possible, a heat exchanger, each material-carrier having a box shaped base with an aperture for connection to an aperture of an adjacent material-carrier, or for connection to a first pipe of said fluid moving means which opens into a treatment volume so as to form a first fluid flow in one direction, the flow of said fluid in the other direction following a path which includes at least a second pipe of said fluid moving means also opening into said volume, this latter being limited laterally by walls extending between the floor and the vault of the tank and said first pipe and at least said second pipe each open into said volume through one or more passages formed in the vicinity of the floor of the tank.

23 Claims, 34 Drawing Sheets

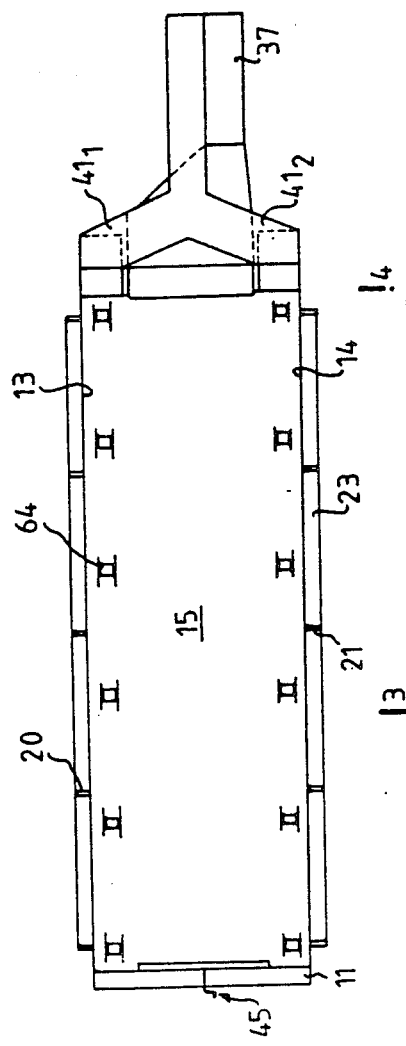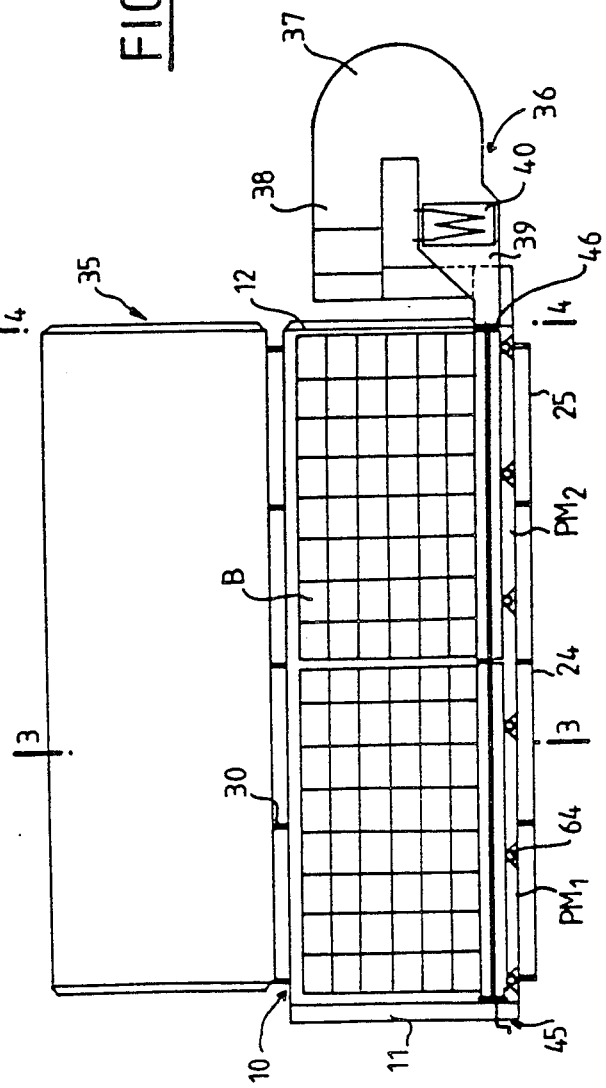

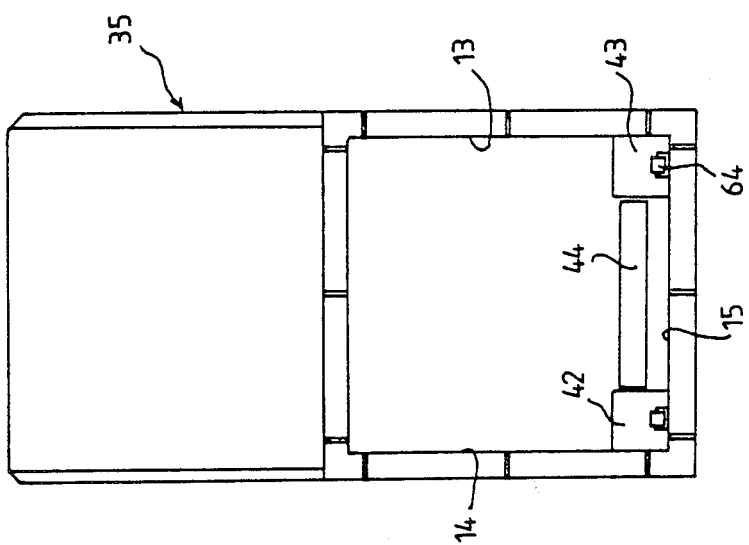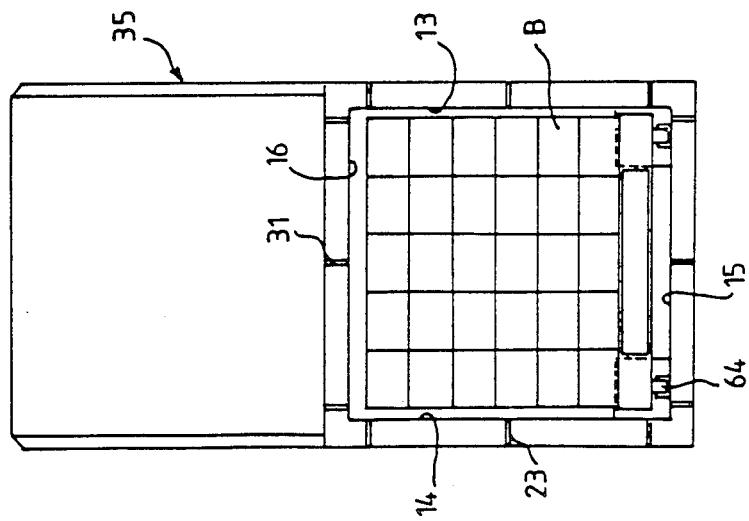

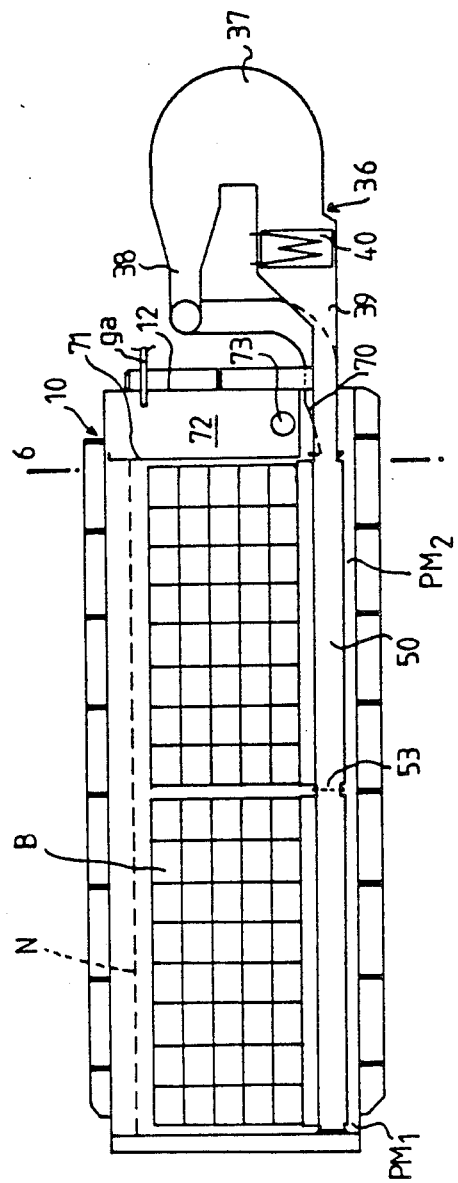
FIG.5
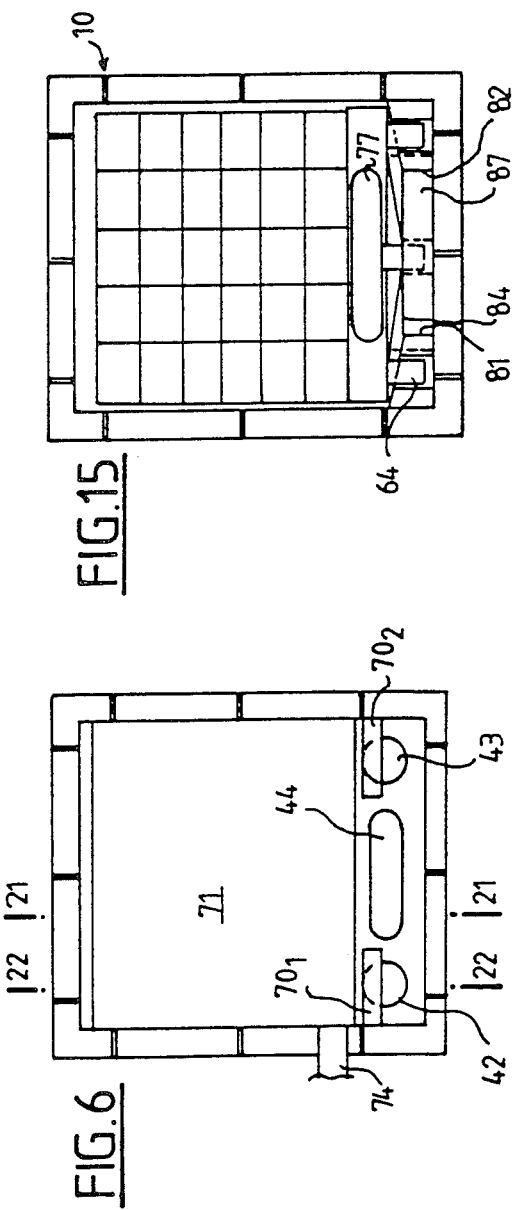
FIG.15
FIG.6

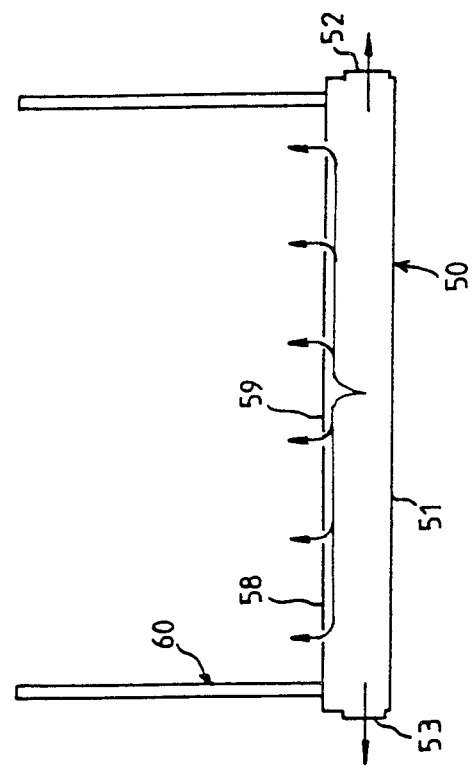
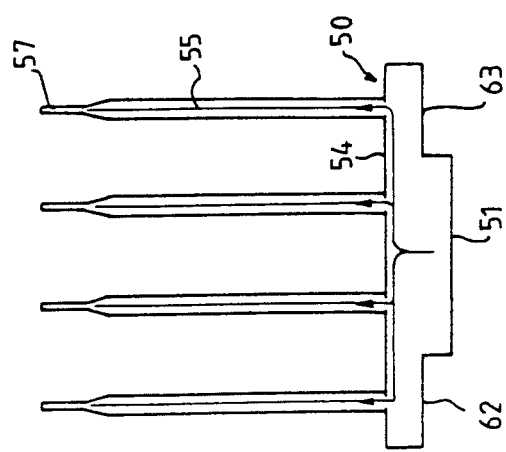

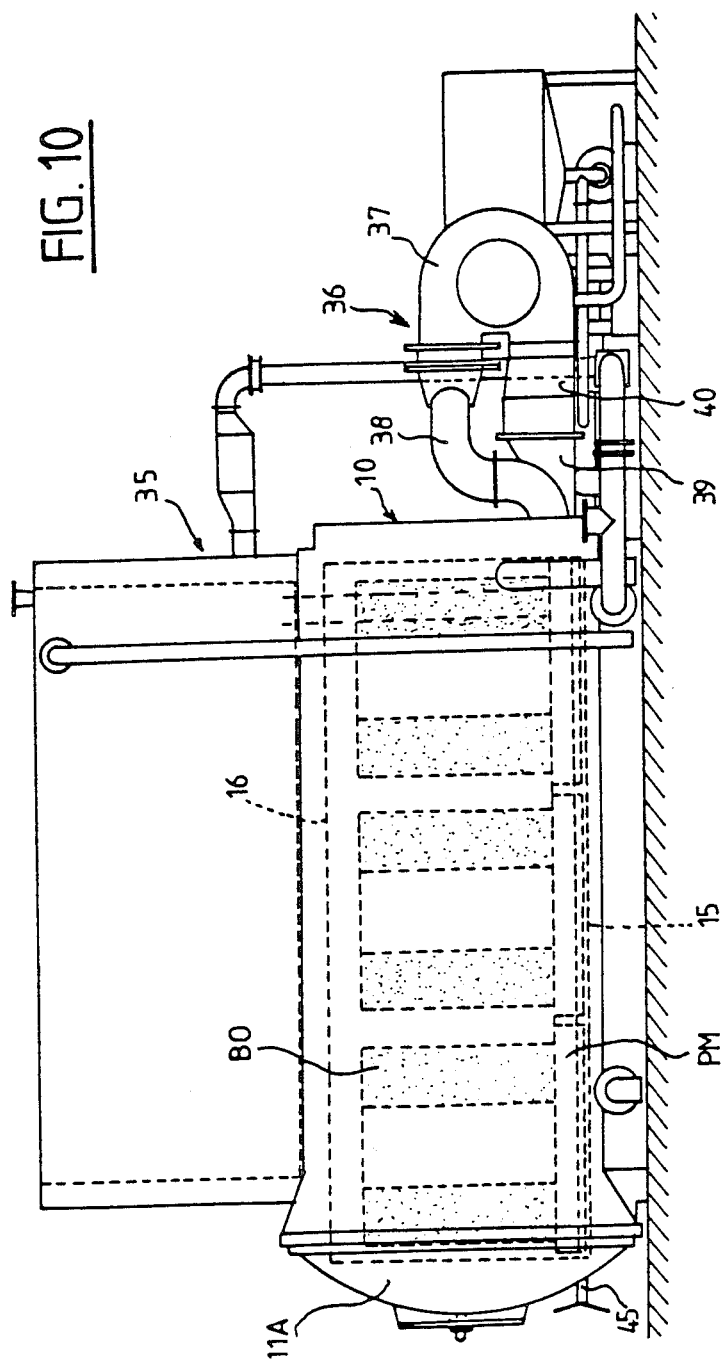

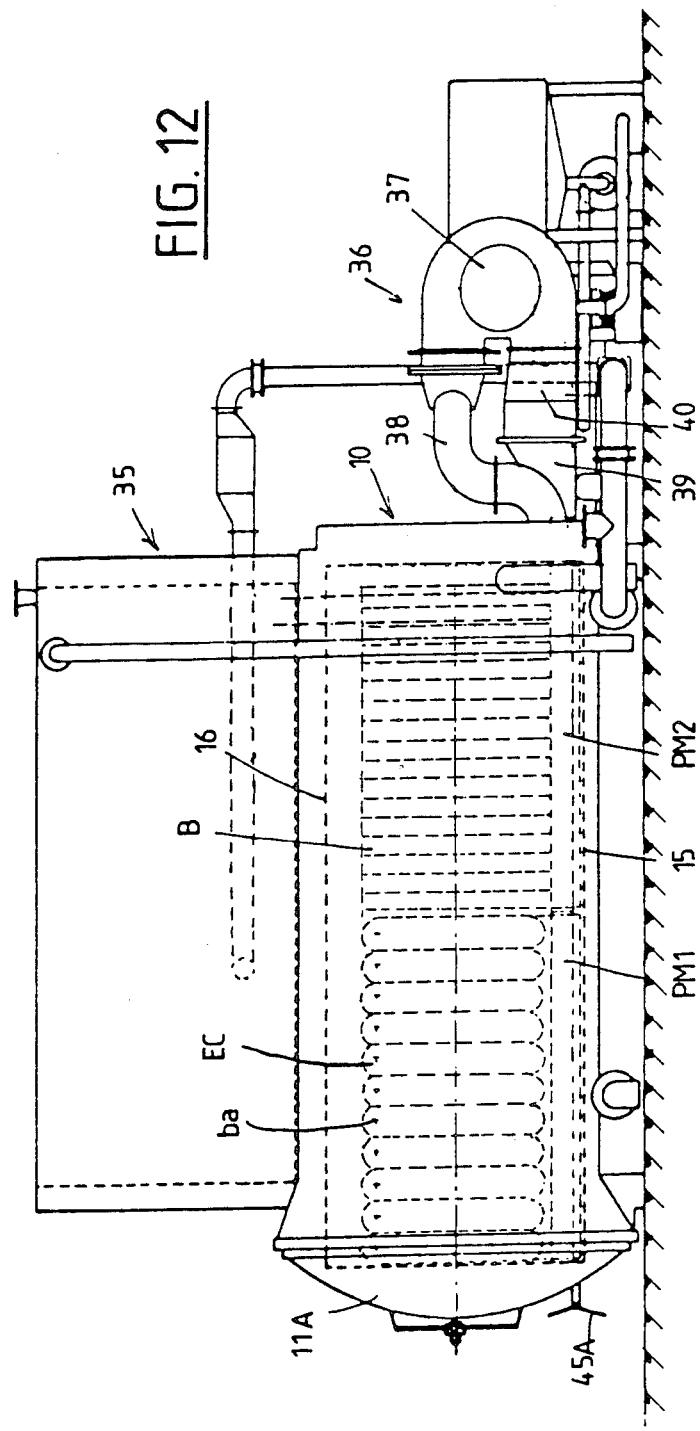

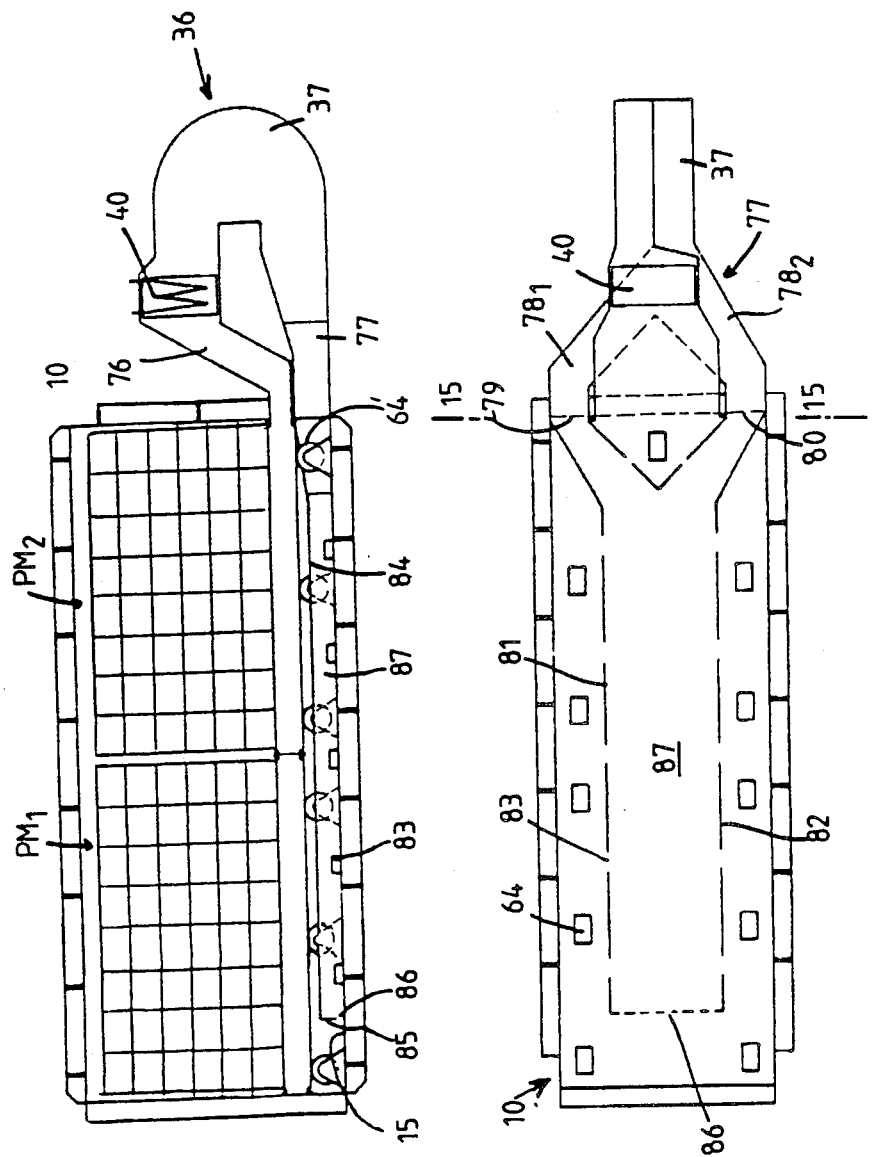

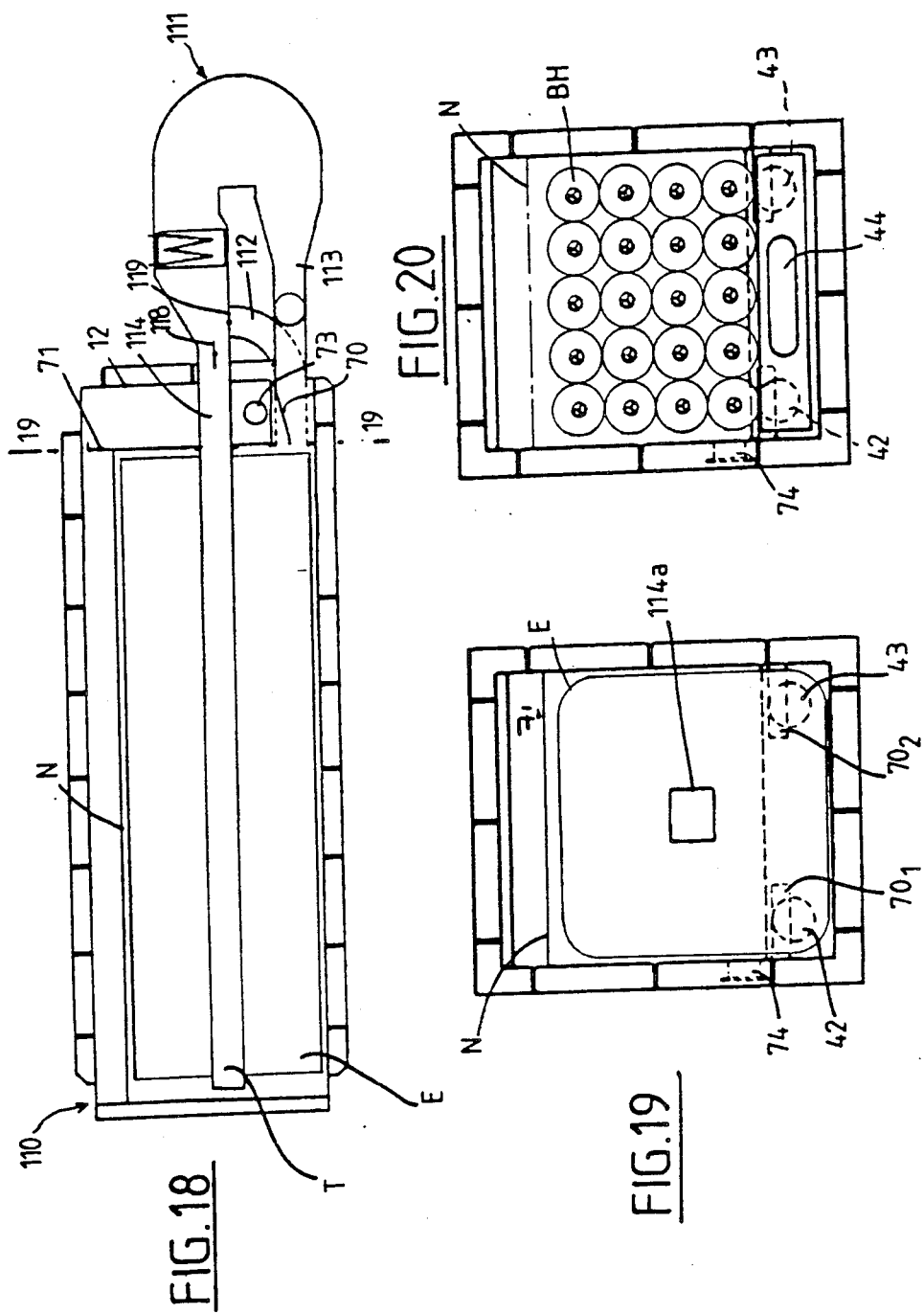

FIG. 21
FIG. 22
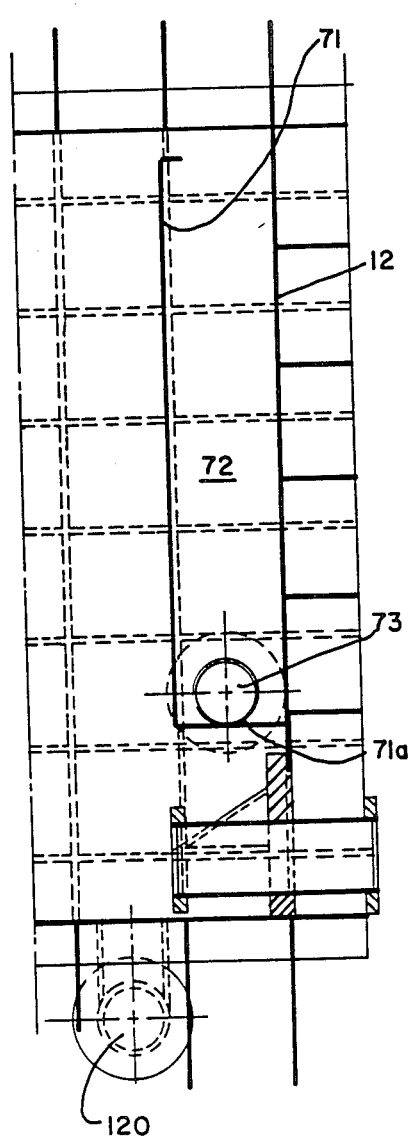
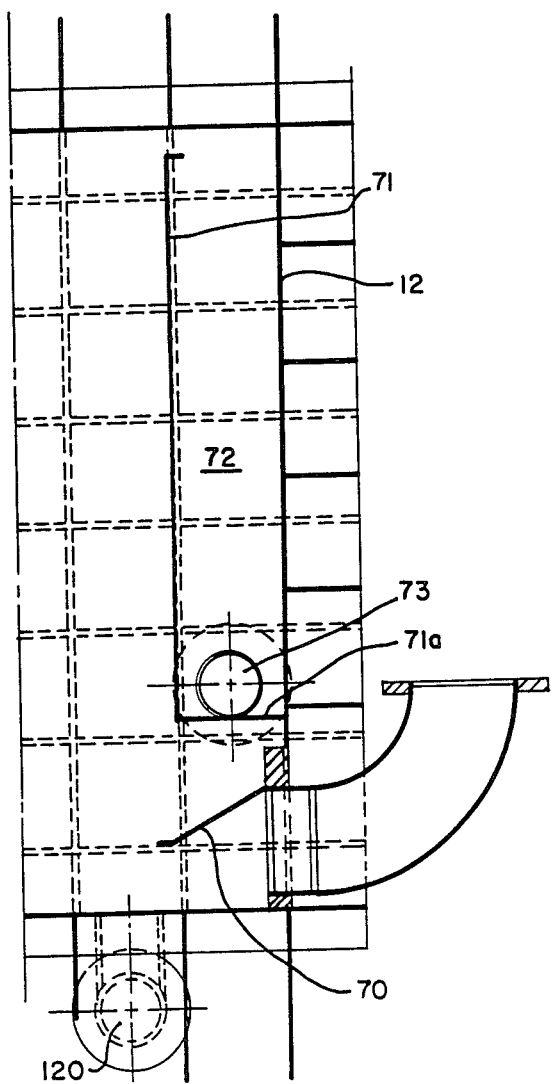

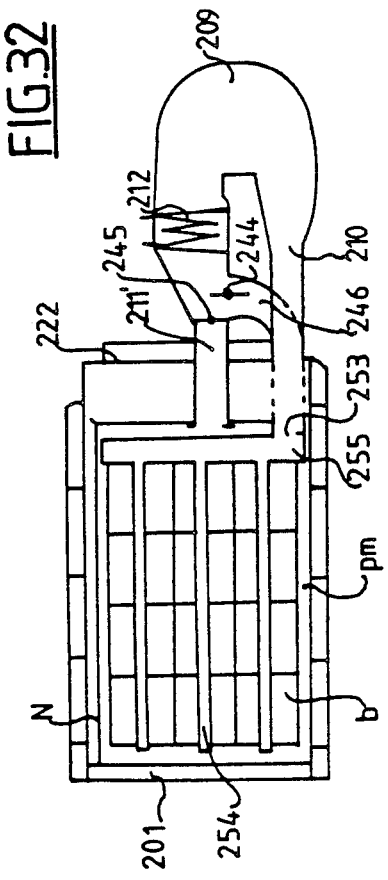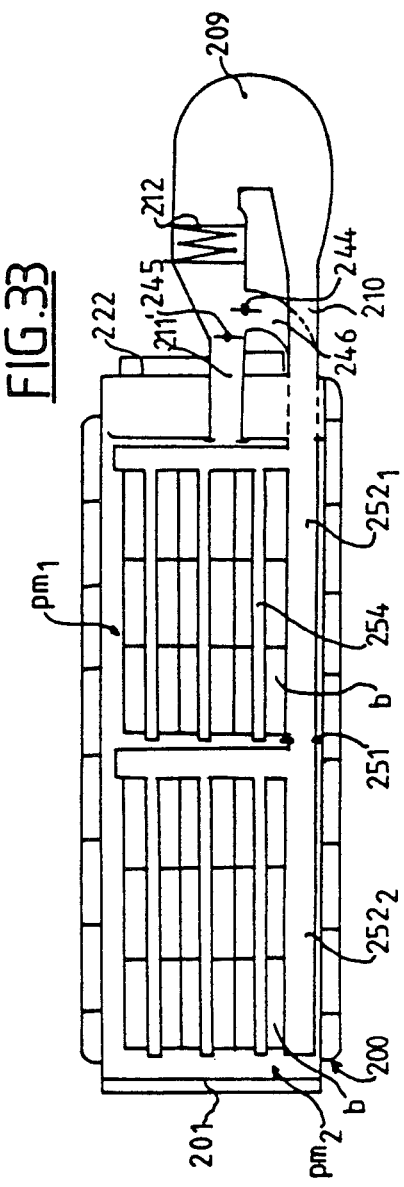

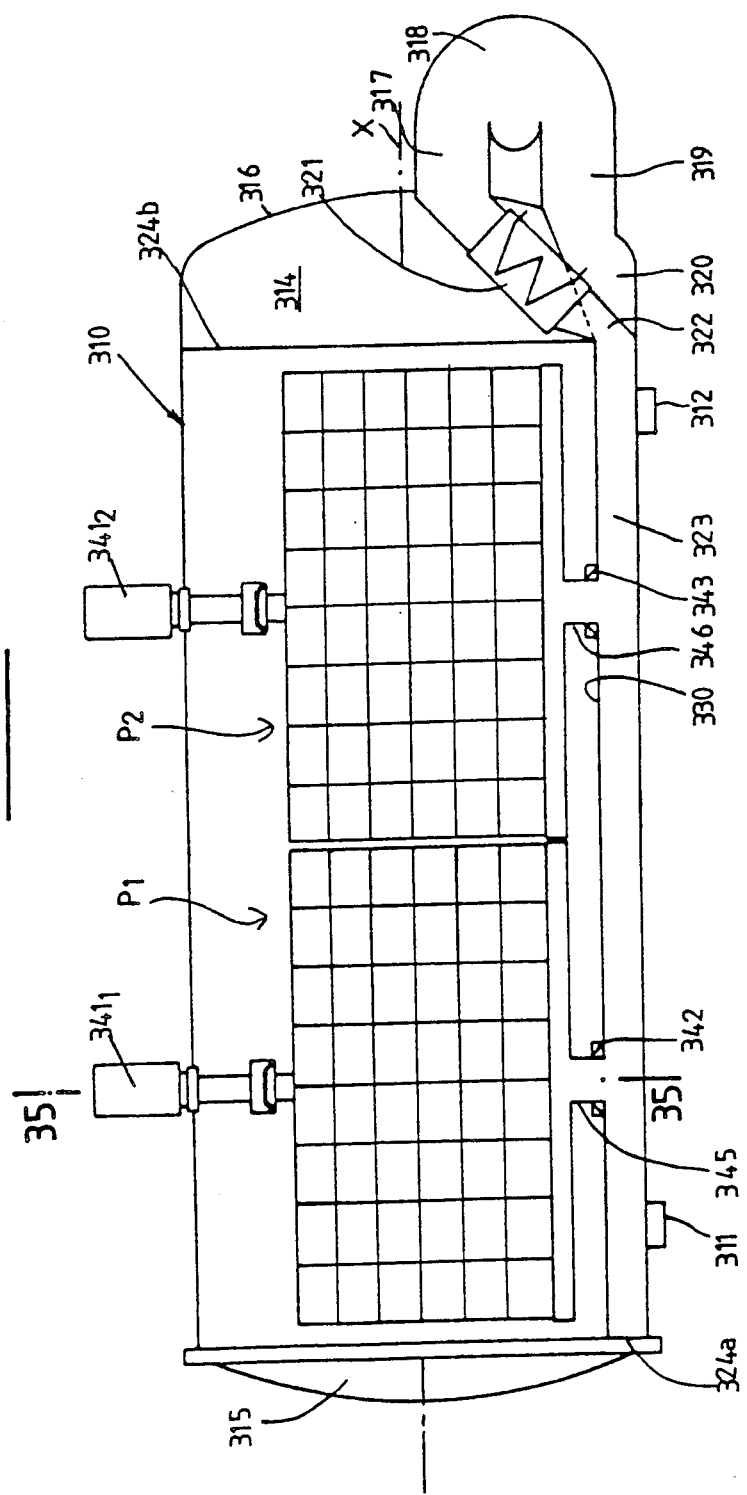

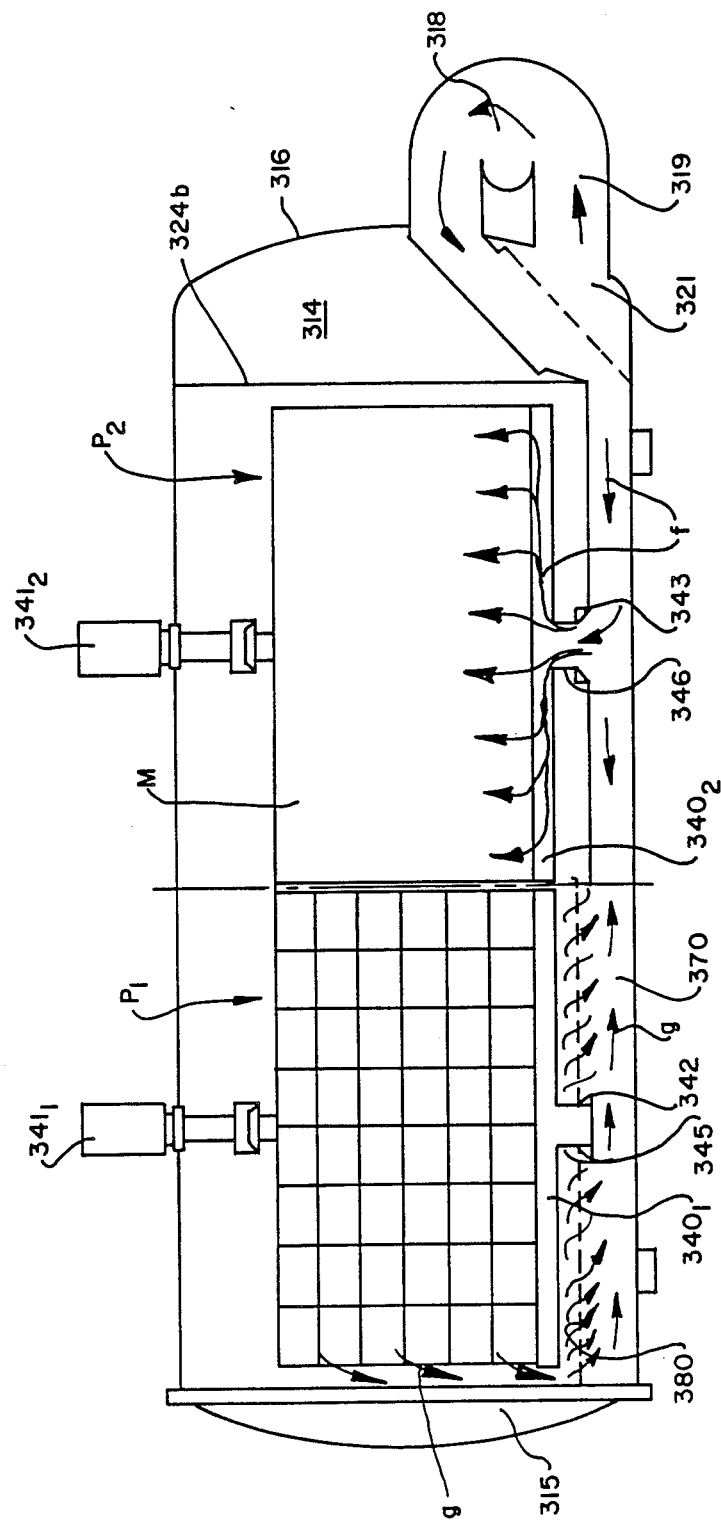

INSTALLATION FOR THE WET TREATMENT OF TEXTILE MATERIALS DISPOSED ON MATERIAL CARRIERS

BACKGROUND OF THE INVENTION

1. Field of the invention

The invention relates to an improved installation for the wet treatment of textile materials disposed on material-carriers.

It relates in particular to an installation for the treatment of textile materials having a basis of natural, synthetic or artificial threads or fibers or mixtures thereof, whether said materials are in the form of yarns, floss, worsteds, ribbons, twisted cords, spinning cakes, woven or knitted pieces, yarn beams, skeins of yarn, etc... and the invention which anticipates application to such materials each treated alone or, alternately, in a mixed way, also contemplates therefor in particular but not exclusively, treatment such as dyeing, bleaching, fixing, etc.

2. Description of the Prior Art

Washing, dyeing or bleaching installations are already known for textile materials in which the treatments are carried out in an autoclave by causing a treatment fluid to flow through said materials disposed on material-carriers, for example bayonet or manifold devices for the treatment of reels of yarns. Such autoclaves are either disposed horizontally, that is to say with a treatment enclosure or tank with horizontal axis, or are disposed vertically.

In this latter case, they are generally erected over pits of greater or lesser depth, covered by a gangway or a floor from which are actuated overhead cranes, travelling gantry cranes or similar for handling the material-carriers for introducing them into and/or removing them from the autoclave. The space required is considerable and, since the civil engineering work and the work for fitting out an installation including such autoclaves, as well as the running and maintenance costs increase considerably with the depth of the pits and/or the below ceiling height when the autoclaves are set directly on the ground, it is advantageous to reduce as much as possible the space required by the autoclaves, so that installations may be constructed or existing installations extended for a lower cost.

In the case of installations with horizontal autoclaves, for the wet treatment of textile materials disposed on carriages similar to tip-up trucks, for example for treating fabric pieces, the autoclaves are generally complex apparatus, cumbersome and suitable for one mode of operation but only for such a mode, so that they are not suitable for the working requirements of modern installations in which greater flexibility is required.

If, whatever the type of installation, it is desired to use a bath ratio as short as possible, that is to say to reduce as much as possible the ratio of the treatment liquid weight to the weight of treated textile materials, then the "useful" volume of the autoclave of the installation, that is to say the volume in which the loaded material-carriers are placed must be as close as possible to that of said loaded material-carriers, while however making possible satisfactory operation, in particular an expansion of said treatment bath when it is heated, for example during dyeing operations.

The correct flow of the treatment fluid through the autoclave and through the material to be treated also contributes to obtaining a satisfactory result, in particular a liquid bath when the wet treatment is dying, said liquid being set in movement by a pump, turbine or similar which causes it to flow in a closed loop in which a heat exchanger may possibly be included. If the dynamic pressure of the fluid set in motion by the pump, turbine or similar is not to cause malfunctions, it is important for the material-carriers and their load to be immobilized simply but reliably in the autoclave, whatever the direction of flow of the fluid — which must moreover be reversible — for example in the case of treating reels of yarn, so as to provide a flow from the inside towards the outside of the reels or vice versa.

Since, complementarily, in the case of static pressurized treatment using for example compressed air or an inert gas — such as nitrogen — the cost for large amounts is not inconsiderable, a satisfactory installation must not only make it possible to fulfill the above mentioned conditions but also to use as small an amount of gas as possible.

SUMMARY OF THE INVENTION

Consequently an aim of the invention is to provide an improved installation for the wet treatment of textile materials which is economic to work, considering the bath ratio required for its working and which further solves simultaneously the different above mentioned problems of such an installation.

It is also an aim of the invention to provide such an installation which can be perfectly integrated in a modern industrial unit for manufacturing textile materials in which the wet treatment represents one of the manufacturing phases between, for example, spinning and weaving or knitting.

In this respect, it is an aim of the invention to provide such an improved installation in which handling of the textile materials is facilitated during the whole of the manufacturing process and which is further designed for the greatest possible automation.

An aim of the invention is also to provide an improved autoclave for such an installation which is as compact as possible and which in particular does not require important masonary work, such as pits or wells, such as required at the present time in known autoclaves, for setting it up or working it.

It is also an aim of the invention to provide an improved autoclave for such an installation which not only is simple to work in so far as the treatment in the autoclave is concerned but also makes possible important gains in productivity, during phases which precede and/or which follow said treatment, for example drying or similar. It is in fact known that the operations for loading the materials to be treated onto their respective supports or for removing them therefrom, when the supports must be adapted to different machines, introduce increases in working time, on the one hand, and labour costs on the other, which are so many obstacles to high manufacturing efficiency.

This is why it is also an aim of the invention to provide an improved autoclave for such an installation for the wet treatment of textile materials which overcomes the above mentioned drawback and which therefore makes possible rationalization of the successive treatments within the same production unit.

It is also an aim of the invention to provide an improved autoclave which, notwithstanding the short or very short bath ratio used in the invention, that is to say the use of small or very small amounts of active agents for the treatment, leads to excellent results insofar as the finished products are concerned, because more particularly of a good flow and distribution of the treatment bath throughout the whole of the autoclave.

It is finally an aim of the invention to provide such an installation adapted to all types of treatments at present used in the field of ennoblement of textile materials, including high temperature and pressurized treatments and which, in addition, allows these treatments to be carried out with bath ratios of the order of 1:3, in the case of an "non immersed material" treatment, as is desired at the present time for reasons of economy of energy, water, dyes, chemical products, as well as for maintaining the effluents to a low value, some of which may be polluent.

An improved installation for the wet treatment of textile materials disposed on material-carriers comprising a tank with substantially horizontal axis one end at least of which is provided with a door for inserting and removing at least one material-carrier on which the textile materials to be treated are loaded, with an apparatus for causing a treatment fluid to flow in a closed loop through said materials by means of a pump, turbine or similar and, if required, with a heat exchanger inserted in said loop, with, for each material-carrier, a box shaped base having at least one aperture for connection to an aperture of an adjacent material-carrier, or for connection to a first pipe of the apparatus causing movement of the fluid which opens into a treatment volume so as to form a first flow path of the fluid in one direction, the flow of said fluid in the other direction following a second path which includes at least a second pipe of said apparatus also opening into said volume, is characterized in that this latter is limited laterally by walls extending between the floor and the vault of the tank and in that said first pipe and at least said second pipe each open into said volume through one or more passages formed in the vicinity of the floor of the tank.

In a preferred embodiment this latter has a general parallelepipedic shape, with quadrangular cross section; because its area is little different from that of the loaded material-carriers, the bath ratio used in such an installation is extremely low.

It is further reduced, in some cases, for example the treatment of yarn beams or reduced amounts of yarn by adding to the tank one or more inert bodies in the vicinity of the yarn beam or reels of yarn, the inert bodies being separate from the material-carrier, or, as a variant, secured thereto.

With such an arrangement, using a closed inert body resisting the pressure and in the case of a static pressurized treatment, for example with compressed air or inert gas such as nitrogen, it is possible to reduce the amount of gas used and thus reduce correspondingly the costs of working the installation.

In a variant, the tank is of a general cylindrical shape with circular cross section, also having an area little different from that of the loaded material-carriers.

In yet another embodiment, the tank is cylindrical with circular cross section but contains bath reducers whose cross section is formed in circular segments, so that they define a useful parallelepipedic volume having a cross section also little different from that of the loaded material-carriers.

So as to reduce the ground occupancy of an improved installation of the invention, on the upper part of the tank a bath preparation container is further provided, connected in operation to the tank through the usual piping, valves and pumps for introducing the bath or emptying it, etc.

In such an embodiment, and in particular when the tank has a quadrangular cross section and is intended to operate as an autoclave, the pressure resistance is obtained by means of transverse stiffeners and possibly longitudinal strengtheners disposed on its periphery, the low part of the stiffeners or of some of them serving as a support, on the ground, for the tank-bath preparation assembly.

In a preferred embodiment, the tank has a flat bottom with, on its internal face, rolling means with which two tracks formed on the box of the material-carrier are adapted to cooperate during introducing and/or removal of these latter into and/or from the tank.

Said material-carriers have then a particularly simple structure, since they are formed mainly by the case forming their lower part.

When the materials to be treated are reels or similar, bayonets or manifolds are erected on the base, evenly disposed in rows and columns, or in a staggered arrangement, for materializing the axis of the stacks of reels, as well as the fluid flow channels inside said reels.

When, more specifically, the materials to be treated are worsted ribbons, floss or twisted cord, the base is correspondingly provided with means for holding said ribbons, floss or cord in position, such as collars or similar.

In another embodiment, also intended for the treatment or reels of yarn or similar, the material-carriers are without bayonets or manifolds but are then adapted to be equipped with modules having means for holding the stacks of reels in position in a regular arrangement of rows and columns or in a staggered arrangement.

In yet another embodiment, it also intended for the treatment of reels of yarn or similar, the material-carriers are designed for supporting the reels not vertically but in horizontal rows and the box shaped bases of the material-carriers are then provided with corresponding members for holding in position the spindles holding the reels, on the one hand, and for feeding and/or returning the treatment fluid to or from said reels, on the other.

In another embodiment, intended for the treatment of skeins of yarn, the material-carriers have on the longitudinal lateral faces of the box shaped bases means for supporting rectilinear "rods" carrying the skeins and which are disposed parallel to each other and perpendicularly to the axis of the treatment tank.

In one embodiment of the installation, provided for mixed use, namely the treatment of materials in the form of reels of yarn or worsted yarn but also yarn beams, with the apparatus for setting the fluid in movement is associated a third pipe which opens into the wall of the tank opposite the yarn beam carrying tube with valve means for establishing the fluid path appropriate for the materials being treated from the turbine or similar which said apparatus comprises.

In such an embodiment, the yarn beam carrier and the yarn beam formed thereon have a quadrangular cross section, advantageously square or rectangular.

In a variant, a plurality of yarn beams are disposed on the same yarn beam carrier which has a generally quadrangular cross section, with yarn beams advantageously placed at the angles of the square or rectangular section.

In another embodiment of an improved installation according to the invention, the flow of treatment fluid in one direction takes place through a longitudinal duct which extends substantially in the median plane and in the bottom of the tank, the flow of fluid in the other direction taking place through at least one and preferably two longitudinal channels which also extend in the tank in the vicinity of said median duct.

In such a structure, the connection of the median longitudinal duct to the material-carriers, for the passage of the treatment fluid, takes place from one or advantageously several orifices formed in a wall defining said duct and to which may be connected, with interpositioning of sealing means, connecting stubs provided on each treatment fluid distribution case or similar associated with a material-carrier.

The lateral flow channel or channels for the treatment fluid may also be defined by the lateral and/or top faces of the material-carriers.

In a preferred embodiment, the longitudinal median duct for fluid flow in one direction has a cross section in the form of a circular section and fluid flow in the other direction takes place above said median duct.

In another embodiment, the means for setting the treatment fluid in movement, such as a turbine or similar, the heat exchanger and the associated means are disposed at one end of the tank, substantially in a longitudinal median plane thereof.

Whatever the embodiment of the installation, in accordance with the invention it may be worked using the longitudinal median duct for distribution of the treatment fluid, that is to say feeding this latter through the materials to be treated, the fluid being taken up, that is to say removed after treatment, by returning to the fluid flow circuit, through one or more longitudinal or lateral channels.

In a second embodiment, the treatment fluid is distributed through longitudinal or lateral channels and the return takes place through the longitudinal median channel.

BRIEF DESCRIPTION OF THE DRAWINGS

The invention will be better understood from the following description, given by way of example and with reference to the accompanying drawings in which:

FIG. 1 is schematical view in longitudinal section of an improved installation in accordance with the invention;

FIG. 2 is a schematical top view thereof, some parts having been removed for the sake of clarity;

FIG. 3 is a sectional view through line III—III of FIG. 1 but on a larger scale;

FIG. 4 is a schematical sectional view through line IV—IV of FIG. 1 but on a larger scale;

FIG. 5 is a view similar to that of FIG. 1 but for another embodiment;

FIG. 6 is a sectional view through line VI—VI of FIG. 5 but on a larger scale;

FIG. 8 is a cross sectional view of the material-carrier shown in FIG. 7;

FIG. 9 is a longitudinal sectional view of a variant of construction;

FIG. 10b is a corresponding front view, that is to say from the side of the door for loading and/or unloading the material-carriers;

FIG. 12 is a view similar to that of FIG. 10 but illustrating the use of the installation for the combined treatment of skeins of yarn and reels of yarn;

FIG. 13 is a view similar to FIGS. 1 and 5 of yet another embodiment;

FIG. 14 is a top view, some parts having been removed for the sake of clarity, of the embodiment shown in FIG. 13;

FIG. 15 is a sectional view through line 15—15 of FIG. 14 and on a larger scale;

FIG. 18 is a view similar to that of FIG. 16 for yet another embodiment;

FIG. 19 is a sectional view through line 19—19 of FIG. 18 but on a larger scale;

FIG. 20 is a sectional view through line 20—20 of FIG. 16 but on a larger scale;

FIG. 21 is an enlarged view, in section through line 21—21 of FIG. 6

FIG. 22 is a view similar to that of FIG. 21 but taken along the sectional line 22—22 of FIG. 6;

FIG. 32 is a view similar to that of FIG. 30 but illustrating another embodiment;

FIG. 33 is a view similar to that of FIGS. 30 and 32 but for yet another embodiment;

FIG. 34 is a longitudinal sectional view of an autoclave for an improved installation of the invention;

FIG. 36 is a schematical view similar to that of FIG. 34 but whose right hand part corresponds to a section through line 36—36 of FIG. 35, whereas the left hand part corresponds to a section through line 37—37 of the same FIG. 35;

MORE DETAILED DESCRIPTION OF THE INVENTION

Figure 7:
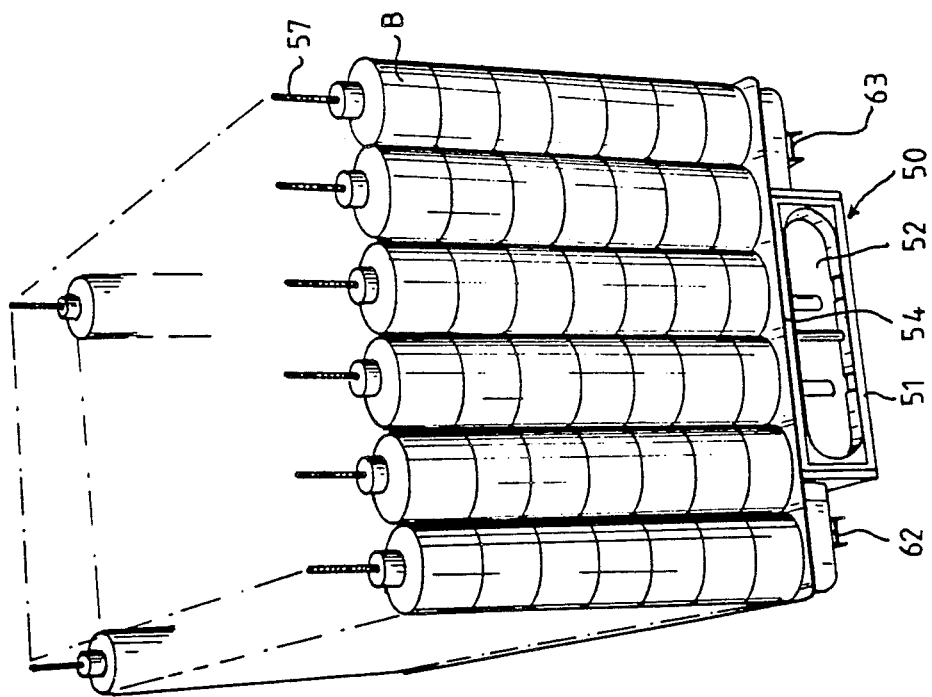
FIG. 7 is a schematical perspective view of a material-carrier of an improved installation of the invention for a first embodiment.

Reference is made first of all to FIGS. 1 to 4 which illustrate the general structure of an improved installation in accordance with the invention for the wet treatment of textile materials disposed on material-carriers, in a first embodiment. This installation comprise a tank 10 with substantially horizontal longitudinal axis and which stands directly on the ground S of a plant for the wet treatment of textile materials such as a dye works or similar, without this indication of course having any limitative character whatsoever. Tank 10 has at one of its ends a door 11, advantageously of the pivoting or shutter type and, at its other end, a front wall 12. As can be seen in FIGS. 3 and 4, tank 10 is advantageously parallelepipedic in shape and is defined by lateral vertical walls 13, 14, a flat floor 15 and a flat vault 16.

As is clear from these same Figs., tank 10 is provided with transverse stiffeners 20, 21 etc. some of which may serve for standing the tank on the ground and, possibly longitudinal reinforcements such as those shown at 23, 24, 25.

At the top part of tank 10, that is to say above vault 16, the stiffeners 30 and the possible reinforcements 31 serve, complementarily, for supporting a bath preparation container 35, which is connected by pipes, valves and motors, not shown, to the tank 10, on the one hand, and to an apparatus 36 on the other, for setting the treatment fluid in movement in the tank. Said apparatus includes a pump or turbine 37 with suction or delivery pipe 38 and with delivery or suction pipe 39, respectively, with, in one and/or the other of said pipes, here pipe 39, a heat exchanger 40, the two pipes 38 and 39 in which the treatment fluid flows in a closed loop circuit being connected to the inner volume of tank 10 where the materials to be treated are housed.

In the embodiment considered, pipe 38 is in the form of a pair of trousers from which extend two legs $41_1$ and $41_2$ which are connected to passages 42 and 43 formed in the front wall 12 of tank 12 whereas pipe 39 is connected to a passage 44, also formed in said wall, in the form of a button hole whose largest dimension is directed perpendicular to the axis of said tank, FIG. 4.

Since the front wall 12 is flat, passage 44 can be given and is effectively given considerable length which, if the passage were formed in the hemispherical bottom of a usual tank would be, all other things being equal, at a greater distance from the bottom whereas it is here very close to the bottom or floor so that the installation of the invention may provide a multiplicity of types of treatments as will be explained hereafter.

In the operating condition of the installation, that is to say that in which the materials to be treated, for example reels of yarns or threads B disposed on material-carriers $PM_1$ and $PM_2$, are in position in tank 10, the passages 42, 43 and 44 communicate respectively with the space outside the textile materials being treated and with the box shaped bases 50 which said material-carriers comprise, FIGS. 7 and 8. More precisely, each material-carrier PM intended to equip an improved installation of the invention comprises mainly a box 50 with rectangular plane contour and solid bottom 51 and whose periphery has at least one aperture for the intake or the discharge of said treatment fluid, said apertures being sealingly joined together between two adjacent material-carriers or between a material-carrier and passage 44 when a crank device 45 is actuated which is provided on door 11 and which simultaneously immobilizes the material-carriers in the tank.

Figure 10A:
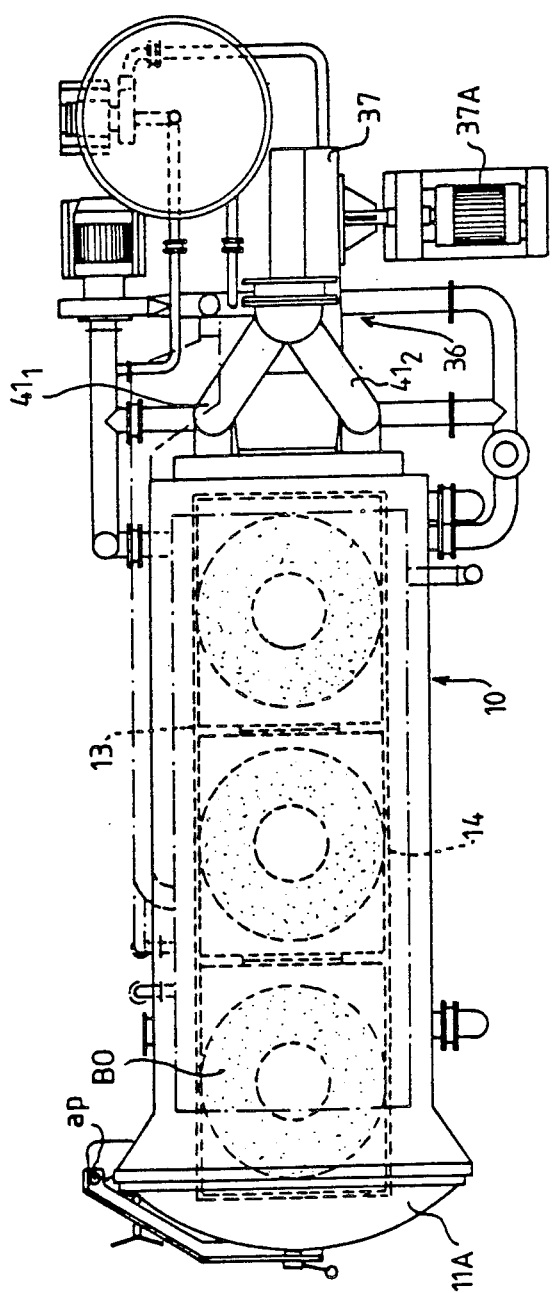
FIG. 10a is corresponding schematical top view.
Figure 17:
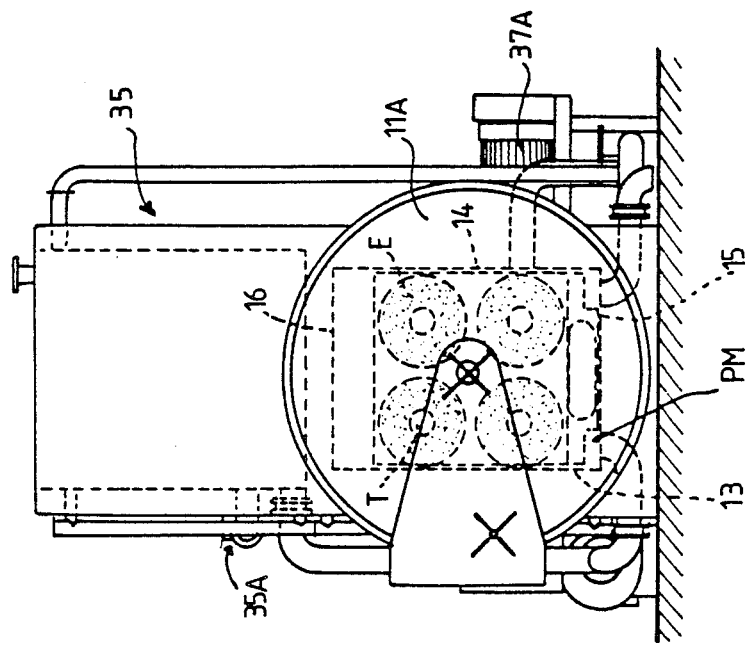
FIG. 17 is a view similar to that of FIG. 10b illustrating the use of an installation of the invention for the treatment of a plurality of horizontal yarn beams.
Figure 10:
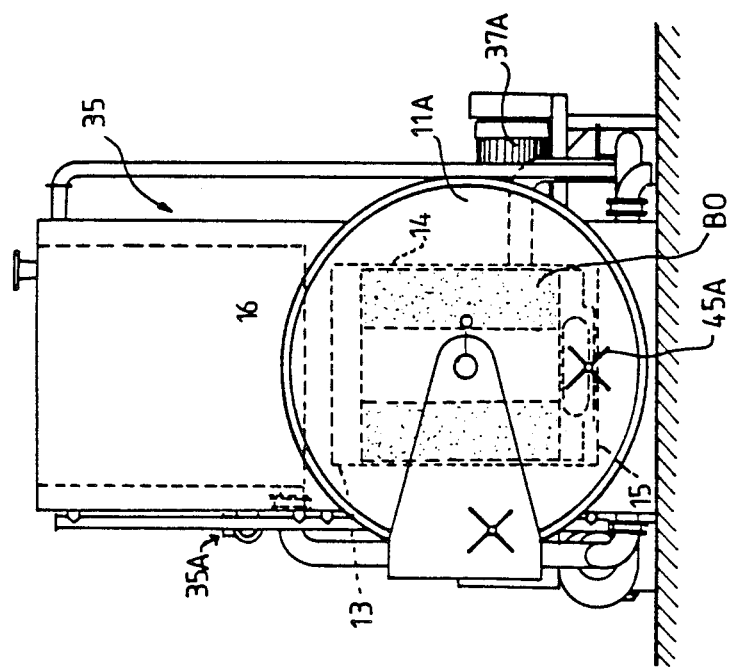
FIG. 10 is a schematical elevational view of an improved installation of the invention for the treatment of twisted cord or floss.

When, in the preferred variant shown in FIGS. 10 and 12 and 17 door 11a is a quick opening door mounted for pivoting about a shaft ap and not a shutter type door, it is a similar process which is used, the actuation of a hand wheel 45a provided on said door 11A simultaneously immobilizing the material-carriers in the tank and placing the sealing means, such as 46, in operating condition, which are provided about the apertures of the boxes and/or the passages 42, 43, 44 of the outlets of the pipes of the apparatus for setting the fluid in movement in the tank.

In the embodiment shown in FIGS. 7 and 8, fluid is taken into box 50 through an aperture 52, whereas the fluid leaves or may leave the box through an aperture 53, at its opposite end, the fluid also flowing through channels 55 fed from openings in the ceiling 54 of the box and which are formed by bayonets 57 or manifolds (formed by perforated tubes, not shown) erected on box 50. The solid bottom 51 thereof has two longitudinal set-backs which form paths 62 and 63 for cooperating with rolling means 64, placed on the floor 15 of tank 10, said rolling means being also those used when the installation uses the material carriers shown in FIG. 9.

When, on the other hand, the flow of fluid through the materials to be treated is reversed from that defined above, namely from the outside towards the inside of reels B, the treatment fluid is set in movement by the pump or turbine 37 so as to be fed into tank 10 through passages 42 and 43 in wall 12, the return taking place through the boxes 50 of the material-carriers before being taken up by the pump or turbine 37 through passage 44, the heat exchanger 40 and pipe 39.

Whatever the fluid flow mode may be, the invention also provides for application of the material-carriers as shown schematically in FIG. 9 and which, although they also include a box 50 of the same structure as that of the preceding embodiment are however without bayonets or manifolds. In such an embodiment, the upper face 50 of the box is pierced with fluid passage orifices 59 disposed to correspond with stacks of reels carried by a module, not shown, and which may be placed and immobilized on the box through means shown schematically at 60.

In the embodiment of the installation illustrated in FIGS. 5 and 6, the reels B to be treated are loaded on material-carriers PM₁ and PM₂ of a structure similar for example to that of the material-carrier shown in FIG. 7 and 8. In this embodiment, however, tank 10 is provided complementarily with deflecting plates 71 and 72 slanted or oriented towards the floor of the tank so that the dynamic pressure of the fluid set in movement by the pump or turbine 37 does not damage the reels the nearest to the outlet of the pipes which do not communicate with the material-carriers. In such a construction, in addition, a substantially vertical dividing wall 71 is provided in the tank, adjacent the front wall 12 and a substantially horizontal wall 71a is provided above the deflecting plates, between dividing wall 71 and wall 12, FIGS. 21 and 22. Such a dividing wall 71, whose height is less than that of the tank, makes it further possible to reduce the volume of treatment bath by defining a space 72 which does not contain the material-carriers and which does not have to be filled with treatment fluid when the treatment takes place with total immersion of reels B, as shown by the level N of the treatment bath.

Furthermore, if a device 73 is provided at the bottom of space 72 for taking up the fluid, the dividing wall 71 also allows a continuous rinsing operation to take place, the liquid taken up by device 73 being discharged through a return pipe 74 to the apparatus 36.

In an embodiment of an installation of the invention with deflecting plates, having a tank of about 4m long, about 1.50 m high and 1.20 m wide, the presence of a dividing wall such as 71 for operating with totally immersed materials, makes it possible to reduce the volume of bath required by about 200 l, with respect to a construction without such a wall.

When the installation is used for treating materials which are not immersed, or partially immersed, and when tank 10, the door and the other means which are associated therewith are organized as an autoclave, it is possible, through the structure of the invention to make considerable savings in the pressurized gas used, particularly when it is an inert gas such as nitrogen which is relatively expensive. Thus, for an autoclave having the above defined characteristics and able to treat up to about 800 kg of material in a single run, the savings may be of the order of 3 to 3.5 m³ per run or more, that is to say an appreciable fraction of the volume of gas used which may be introduced into the tank by any appropriate means, for example through tappings ga provided in the wall 12 of the vault 16, FIG. 5.

Reference will now be made to FIGS. 13 to 15 relative to another embodiment of the improved installation of the invention. In this installation tank 10 provided with stiffeners and if required reinforcements, as in the preceding embodiments, as well as a bath preparation container, not shown, is associated with an apparatus 36 including a pump or turbine 37 and a heat exchanger 40 inserted in a pipe 76 which opens into tank 10 through a button hole 77, FIG. 15, similar to passage 44 of the preceding embodiments, here, however, for causing the treatment fluid to flow in the direction opposite that of movement in said pipe 76; a trouser shaped part 77 is provided whose legs 78₁ and 78₂ open into the tank through passages 79 and 80, FIG. 14, similar to passages 42 and 43 of the preceding embodiment. Hereagain, however, the floor 15 of the tank is further provided with longitudinal plates 81 and 82 having perforations 83 which define, with a cover plate 84 with return 85 perforated at 86, a duct 87 which promotes collection or distribution of the treatment fluid through the apparatus 36. In this embodiment, also, the material-carriers PM₁ and PM₂ are inserted into and/or removed from the machine by cooperation of tracks formed on their solid bottom with rolling means 64 placed on the floor 15 of the tank.

Figure 16:
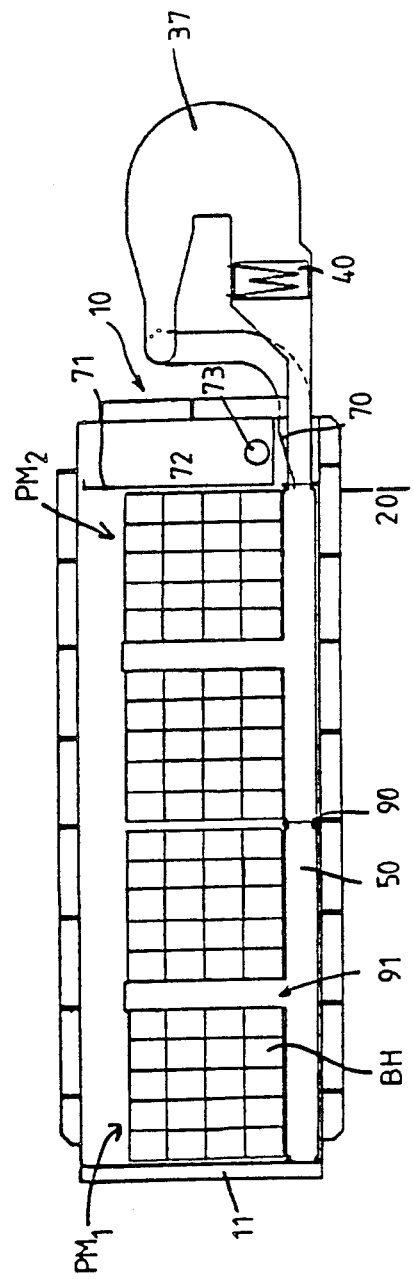
FIG. 16 is a view similar to that of FIG. 5 but for another embodiment of the material-carriers.

In the embodiment shown in FIGS. 16 and 20, the structure of tank 10 is very close, if not identical, to that of the embodiment of FIGS. 5 and 6. In the installation shown in this Fig., however, the material-carriers PM₁ and PM₂ are provided so as to be loaded with reels BH disposed in horizontal rows and no longer in vertical stacks as in the preceding embodiments. Each material-carrier comprises then a box 50, similar to that of the preceding embodiments, with sealing means 90 at the junction of two adjacent boxes and, for each of the boxes, members shown schematically at 91 for distributing and/or collecting the bath flowing through the reels BH from boxes 50, on the one hand, and, on the other, the support for the spindles on which said reels are fitted.

In the preferred embodiment shown in FIGS. 10 to 12 and 17, tank 10, parallelepipedic in shape and defined by the vertical walls 13, 14 which are joined to the floor 15 and to the vault 16, supports a bath preparation container 35, which is connected through pipes, valves and motors shown schematically at 35a (FIGS. 10b and 17) to the tank 10, on the one hand, and to the apparatus 36 for setting the treatment fluid in motion.

As in the above described embodiments said apparatus includes the pump or turbine 37 driven by a motor 37a with a suction or delivery pipe 38 (in the form of a pair of trousers with two legs 41₁ and 42₂) and a delivery or suction pipe 39 respectively, with the heat exchanger 40 in this latter.

Figure 11:
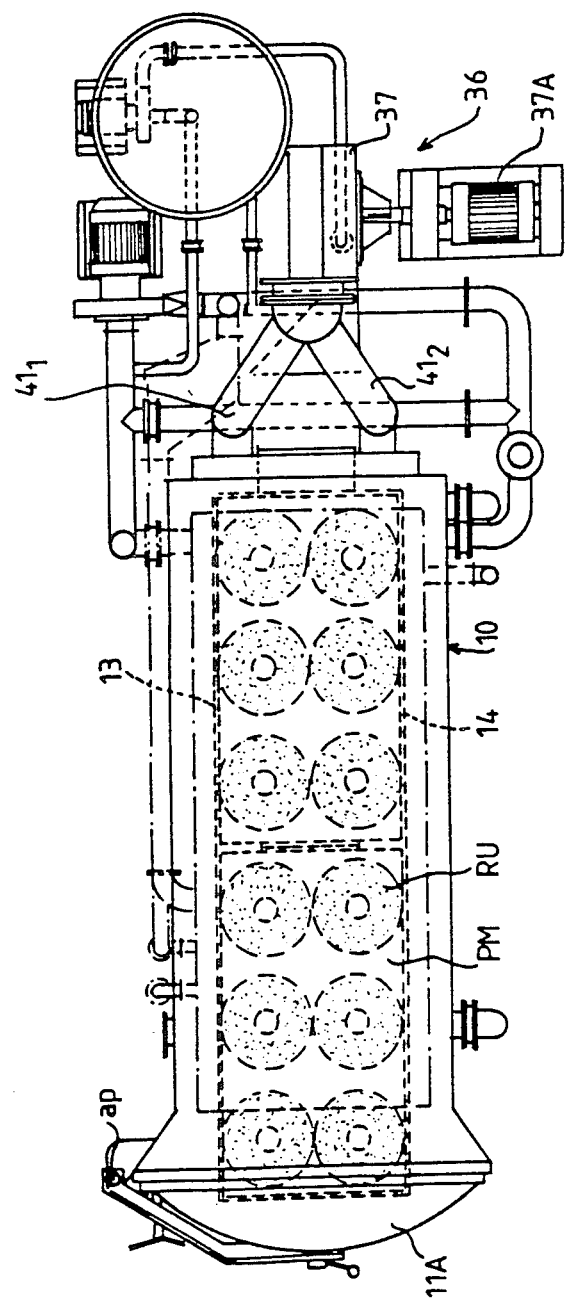
FIG. 11 is a view similar to that of FIG. 10a but the installation being illustrated for its application to the treatment of worsted ribbons.

In FIGS. 10 to 10b, the installation is illustrated as applied for the treatment of floss or twisted cord BO, disposed on three adjacent material-carriers PM, each having an apparent square or rectangular contour; in the case of floss, the material-carrier of this type is closed at the top part by a perforated plate; in FIG. 11, the installation is illustrated as applied to the treatment of worsted ribbons RU disposed on two adjacent material-carriers PM, whereas in FIG. 12, the installation is illustrated as used for a combined and simultaneous treatment of reels of yarn B disposed on a material-carrier PM₂ and skeins of yarn EC disposed on a material-carrier PM, which has on its longitudinal side walls means for supporting "rods" ba carrying said skeins. In FIG. 17, the installation is illustrated for the treatment of a plurality of yarn beams E (four in the example shown) disposed parallel to each other at the angles of a material-carrier PM having beam carrying tubes T.

In the embodiment shown schematically in FIGS. 18 and 19, the installation includes a tank 110 intended to operate or not as an autoclave and which, of a structure very close to that shown in FIG. 5, is however distinguished therefrom by the fact that apparatus 111 for setting the fluid in movement, similar to that referenced 37 above, has not only pipes 112 and 113 similar to pipes 38 and 39, respectively, but also a third pipe 114 which passes through the front wall 12 and the dividing wall 17 so as to open into tank 110 through a passage 114a, of FIG. 19, opposite which may be brought the beam carrying tube T of a yarn beam E with quadrangular cross section, advantageously square or rectangular, as clearly shown in FIG. 19.

In such an installation — for the rest very clearly close to the one shown in FIG. 5 and where the corresponding parts bear the same references — valves are further provided, as shown schematicallY by the butterflies 118 and 119, FIG. 18, inserted in pipes 112, 113 and 114 so as to make possible either the treatment of reels or the treatment or yarn beams E. With such a combined installation, whose mode of working for reels B is similar to that described above, pieces of fabric may also be treated with constant, even low, bath ratio, whether the free level of the bath is as shown at N in FIGS. 18 and 19, that is to say corresponds to the treatment of totally immersed material or on the contrary corresponds to the treatment of non immersed or partially immersed materials.

FIGS. 21 and 22 show on a larger scale the flange and sealing means associated with the pipes for introducing and/or removing fluid into and/or from tank 10, as well as the stiffeners and reinforcements welded to said tank. In these Figs. can also be seen, at 120, a pipe for completely emptying the tank if required.

Figure 23:
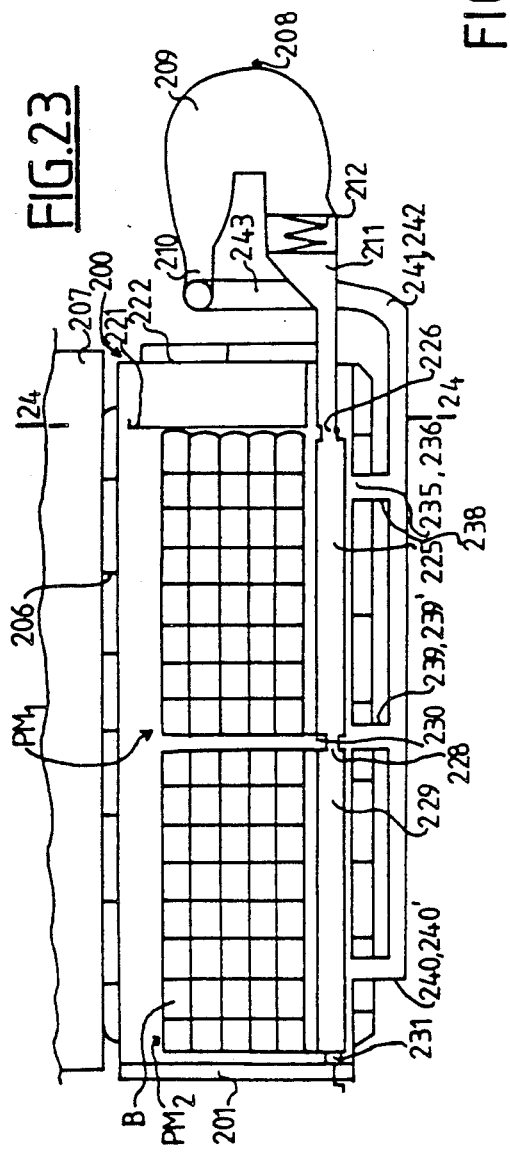
FIG. 23 is a schematical view in longitudinal section of an improved installation in accordance with the invention for another embodiment.
Figure 24:
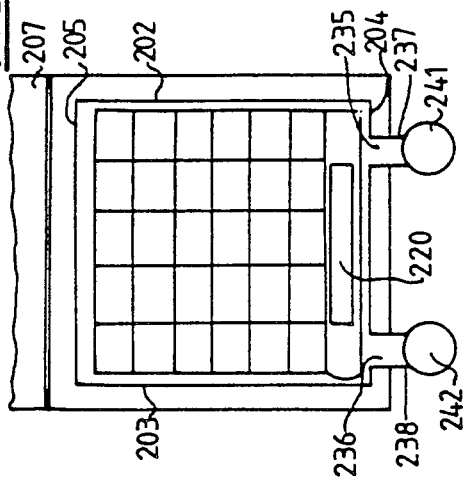
FIG. 24 is a sectional view through line 24—24 of FIG. 23.

Reference will now be made to FIGS. 23 and 24, which illustrate the general structure of an improved installation of the invention for the wet treatment of textile materials disposed on material-carriers but for another type of embodiment. This installation comprises a tank 200, with substantially horizontal longitudinal axis, having at one of its ends a door 201 advantageously of the pivoting or shutter type for introducing into and/or removing from the tank material carriers $PM_1$, $PM_2$, etc. for example material-carriers loaded with reels B of yarn to be dyed. As clearly shown in FIG. 24, tank 200 is advantageously parallelepipedic in shape, defined by lateral vertical walls 202 and 203, joined to a floor 204 and to a flat vault 205. Transverse stiffeners 206 and, if required, longitudinal reinforcements contribute to the mechanical strength of the tank. At the top part of this latter, that is to say above vault 205, said stiffeners and reinforcements serve complementarily for supporting a bath preparation container 207, which is connected by pipes, valves and motors, not shown, to tank 200 on the one hand and to an apparatus 208, on the other, provided for setting the treatment fluid in motion in the tank. Said apparatus includes a pump or turbine 209 with suction or delivery or suction pipe, respectively, with, on one and/or the other of said pipes, here pipe 211, a heat exchanger 212.

Pipe 211 is connected to a passage 220 formed in a wall 221 placed in the vicinity of the rear wall 222 of tank 200, thereinside, the passage 220 being in the form of a buttonhole whose large dimension is directed parallel to floor 204, FIG. 24, and being provided so as to communicate, with interpositioning of sealing means not shown, with an aperture 226 in the box shaped base 225 of the material-carrier $PM_1$, the closest to wall 222.

In the operating condition of the installation, box 225 of material-carrier $PM_1$ is also in communication through another aperture 227 which it comprises with an opening 228 in the box 229 of the material-carrier $PM_2$ which is adjacent thereto, sealing means shown schematically at 230 being inserted between the two boxes.

When the material-carriers $PM_1$ and $PM_2$, are introduced into enclosure 200, the actuation of a crank device 231 provided on door 201 first of all immobilizes the material-carriers in the tank then establishes a first continuous treatment fluid path $t_1$ from pipe 211, via passage 220, aperture 226, box 225, aperture 227, aperture 228 and box 229. This path $t_1$, which may be that feeding treatment fluid into the tank or, conversely, that collecting fluid from the tank, is completed, for forming the closed fluid flow circuit, by a path $t_2$ between the materials to be treated and the tank and which is then, in the first case, a circuit for collecting fluid from the tank and, in the second case, a path for feeding into the tank.

Whatever the flow mode of the fluid, said second path $t_2$ includes pairs of passages such as 235 and 236 formed in the floor 204 of the tank, such pairs being placed advantageously each in at least one transverse plane of the tank and evenly spaced apart along said tank in the embodiment described and shown, that is to say adjacent the rear wall 222, in the median zone and adjacent door 201.

As also shown in FIGS. 23 and 24, to these pairs of passages are connected ducts such as 237 and 238 for the first pair, 239 239' for the second and 240, 240' for the third, said ducts being joined together through pipes 241 and 242, respectively, disposed under the tank and which are connected, through a trouser shaped part 243 to pipe 210 so as to form a continuous fluid circuit by joining paths $t_1$ and $t_2$.

Figure 25:
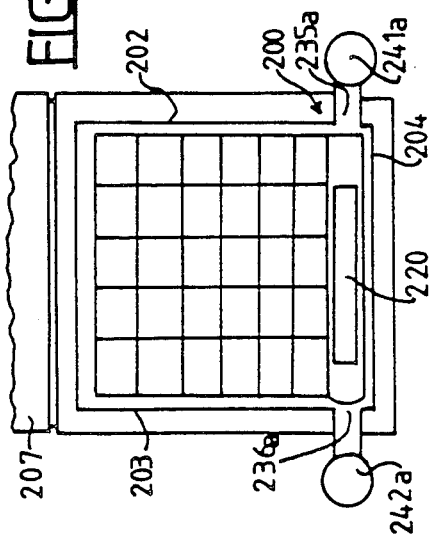
FIG. 25 is a view similar to that of FIG. 24 but for a variant of construction.

In the embodiment shown schematically in FIG. 25, ducts 241a and 242a are placed laterally — and not under the tank 200 —, passages 235a and 236a, similar to passages 235 and 236 of the preceding embodiment, being then provided on the vertical side walls 202 and 203 respectively.

Figure 26:
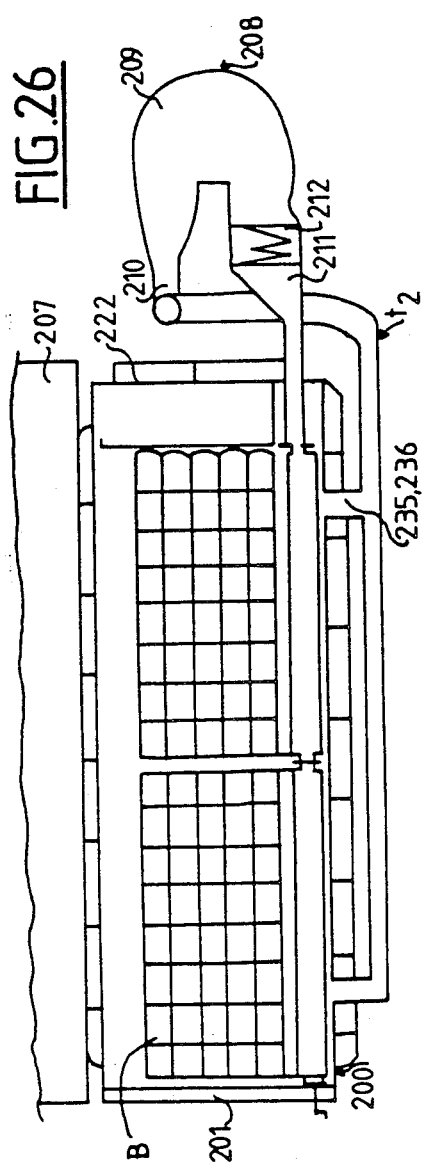
FIG. 26 is a view similar to that of FIG. 23, but for another embodiment.
Figure 27:
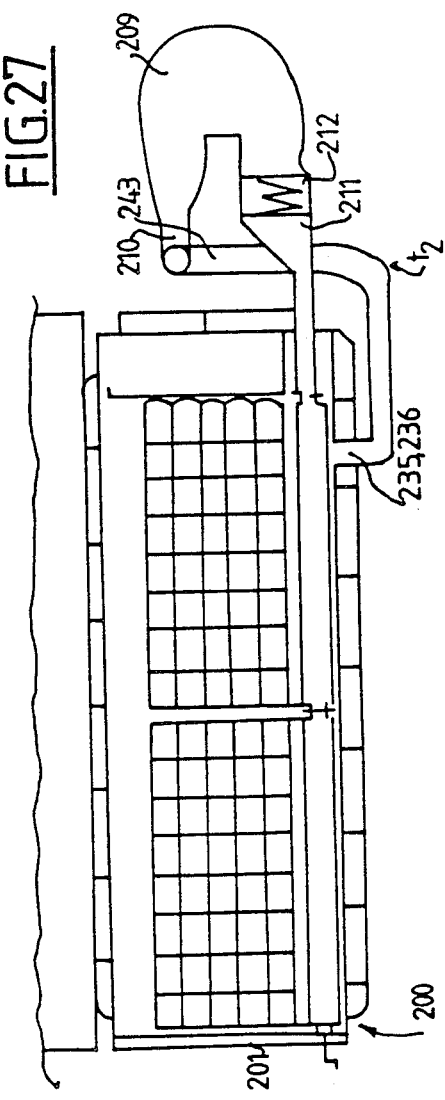
FIG. 27 is a view similar to those of FIGS. 23 and 26 but for yet another embodiment.

In the embodiment shown in FIG. 26, of a structure very close to that illustrated in FIG. 23 and where the same parts bear the same references, the pairs of passages, such as 235-236 or 235a-236a, are only two in number, adjacent the rear wall 222 and door 201, whereas it is a single pair which is provided in the embodiment shown in FIG .27, in which path $t_2$ then has the two passages 235 and 236 in the floor or the vertical side walls of the tank connected by the trouser part 243 to pipe 210.

Each of the embodiments shown and described above may operate, or not, as an autoclave, the removal or introduction of the treatment bath at a plurality of points in the tank promoting in all cases the balanced flow of the bath, which in its turn gives better results for the wet treatment.

Figure 28:
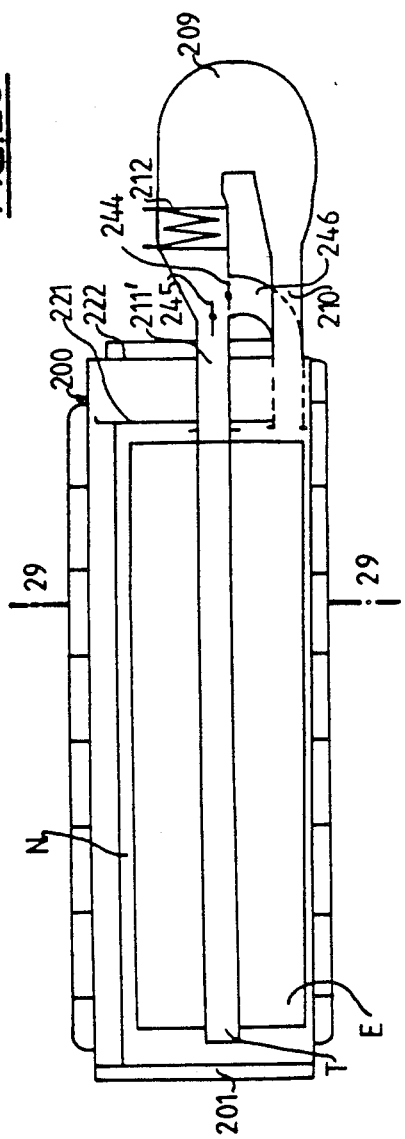
FIG. 28 is a view similar to that of FIG. 23 for yet another embodiment.
Figure 29:
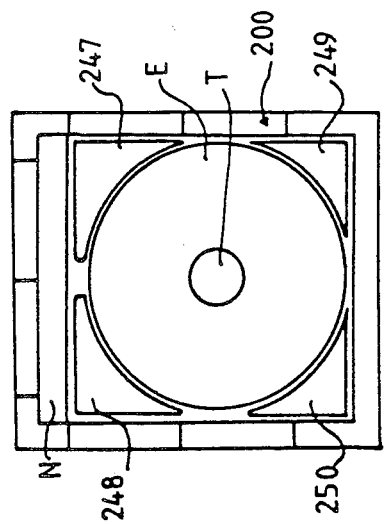
FIG. 29 is a sectional view through line 29—29 of FIG. 28, but on a larger scale.

Whereas this latter has been described above relatively to material carriers loaded with reels of yarns or similar with vertical stacking, the invention is in no wise limited to this application. Thus, FIGS. 28 and 29 show the installation of the invention for treating a beam of fabric E wound on a perforated tube t. When beam E has a substantially circular cross section, inert bodies 247, 248, 249 and 250 with a cross section in the form of a curvilinear triangle are then advantageously disposed in the angles of the tank for further reducing the volume of bath used, the free level of the bath being shown at N. In this embodiment, a pipe 211' is adapted for being connected to the beam carrying tube T; it further includes flaps 244 and 245, the second one for closing pipe 211' and the first one being placed at the junction of a bypass 246 which is connected at its other end to passage 220. Pipe 210, disposed between the pump, turbine or similar 209 and tank 200 opens into this latter through two passages in wall 221.

In a variant, the inert bodies 247–250 are fixed to the carriage or similar which carries the beam carrying tube T.

In another variant, the inert bodies are fixed to an auxiliary carriage separate from that carrying the beam carrying tube.

Figure 30:
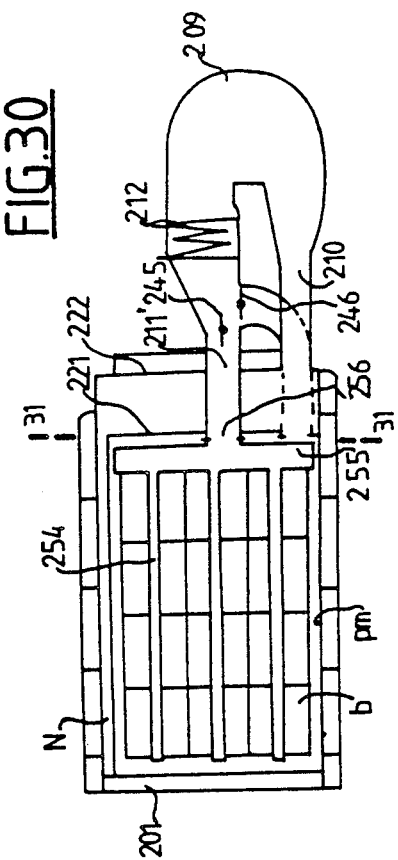
FIG. 30 is a view similar to that of FIG. 28 for a variant of construction.
Figure 31:
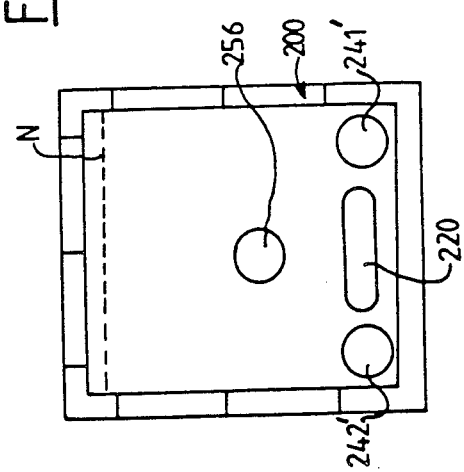
FIG. 31 is a sectional view through line 31—31 of FIG. 30, but on a larger scale.

In the embodiment shown in FIGS. 30 and 31, the apparatus for causing the fluid to flow is of the type described immediately above whereas tank 200 is of shorter length, so as to correspond to that of a single material carrier pm whose box 255 is disposed vertically for supporting, on hollow rods such as 254 fixed to box 255, reels b aligned horizontally on said rods. In this embodiment, pipe 211' of the apparatus for setting the treatment fluid in motion is connected to an orifice 256 of box 255, pipe 210 opening into said tank through passages 241' and 242' whereas the bypass 246 opens thereinto through passage 220.

In the embodiment shown in FIG. 32, box 255 of the material-carrier pm which supports reels b disposed horizontally on rods 254 is not fed at the center, as in the embodiment immediately preceding, but from the bypass 246 which opens through an aperture 253 in the box, the second fluid path then comprising pipe 210. In this construction, and contrary to the one described with reference to FIGS. 30 and 31, flap 245 is closed and flap 244 open.

In the embodiment of FIG. 33, two material-carriers $pm_1$ and $pm_2$ of a structure similar to that shown in FIG. 32 are housed in tank 20a where they each support reels b in a horizontal arrangement placed on rods 254. In this embodiment, the two material-carriers communicate through openings in their box shaped bases $252_1$, and $252_2$, respectively, with interpositioning of sealing means shown schematically at 251.

Reference will now be made to FIGS. 34 to 37 which illustrate the general structure of an improved autoclave for equipping an installation of the invention. The autoclave comprises a cylindrical tank 310 with substantially horizontal longitudinal axis X and which stands on feet 311 and 312 directly on the ground S of a plant for the wet treatment of textile materials, such as a dyeworks or similar, without this indication of course having any limitative character whatsoever. The absence of a pit or a well for the autoclave, as usual in most known installations, makes it possible not only to save on earth moving costs but, also, to carry out inspections and complete operating tests on the site of manufacture of the autoclave, which may then be transported and installed in the treatment plant where its setting up is then extremely rapid. Tank 310 is provided at one of its longitudinal ends with a door 315, advantageously of the quick locking type and, at its other end, with a convex bottom 316. This latter has passing therethrough a delivery or suction pipe 317 of a pump or turbine 318 whose other pipe 319 — which is then the suction or delivery pipe — is continued at the lower part of tank 310 by a connection 320. In pipe 317 is provided a heat exchanger 321 whose output 322 is Connected, in accordance with the invention, to a duct 323 which extends across the bottom of tank 310, thereinside and substantially in the vertical median plane over the whole or substantially whole of the length of the autoclave from a front end wall 324a, FIG. 37, substantially as far as to be in line with a wall 324b, also transversal and formed adjacent the convex bottom 316 with which it defines a space 314, in which may be positioned a part of the above described pipes, in particular the one in which the heat exchanger 321 is mounted by means of a sealed box.

Figure 35:
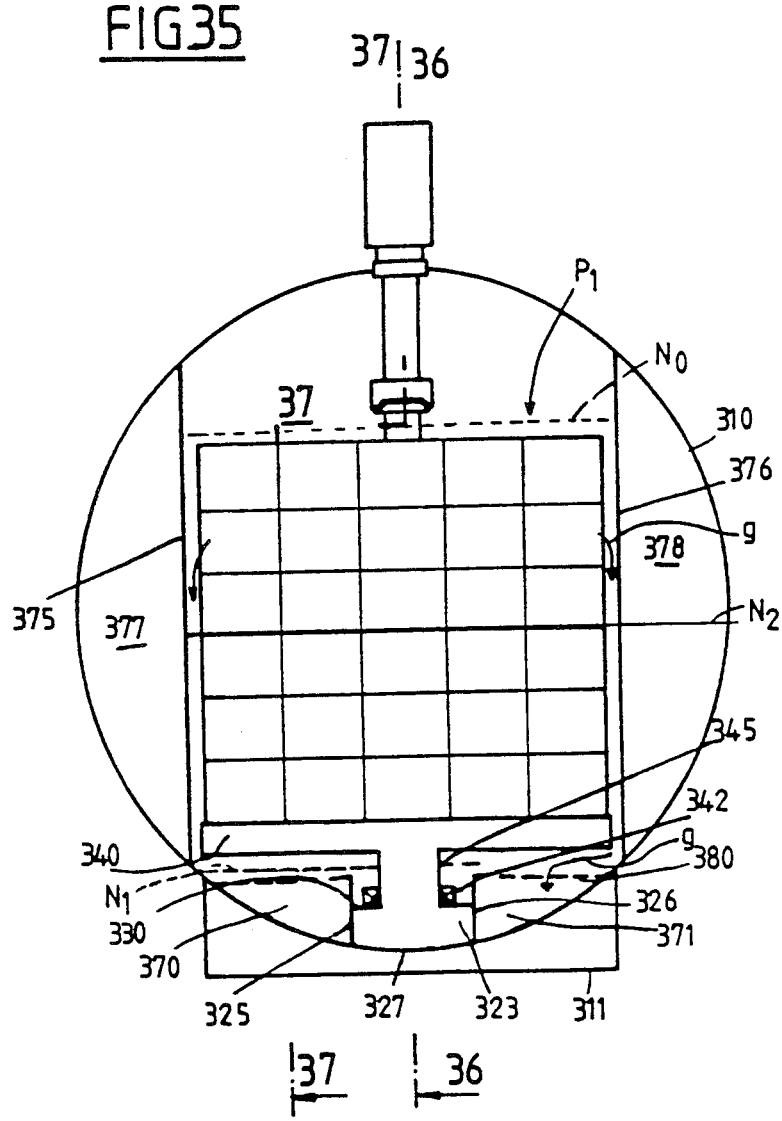
FIG. 35 is a sectional view through line 35—35 pof FIG. 34 but on a larger scale.
Figure 37:
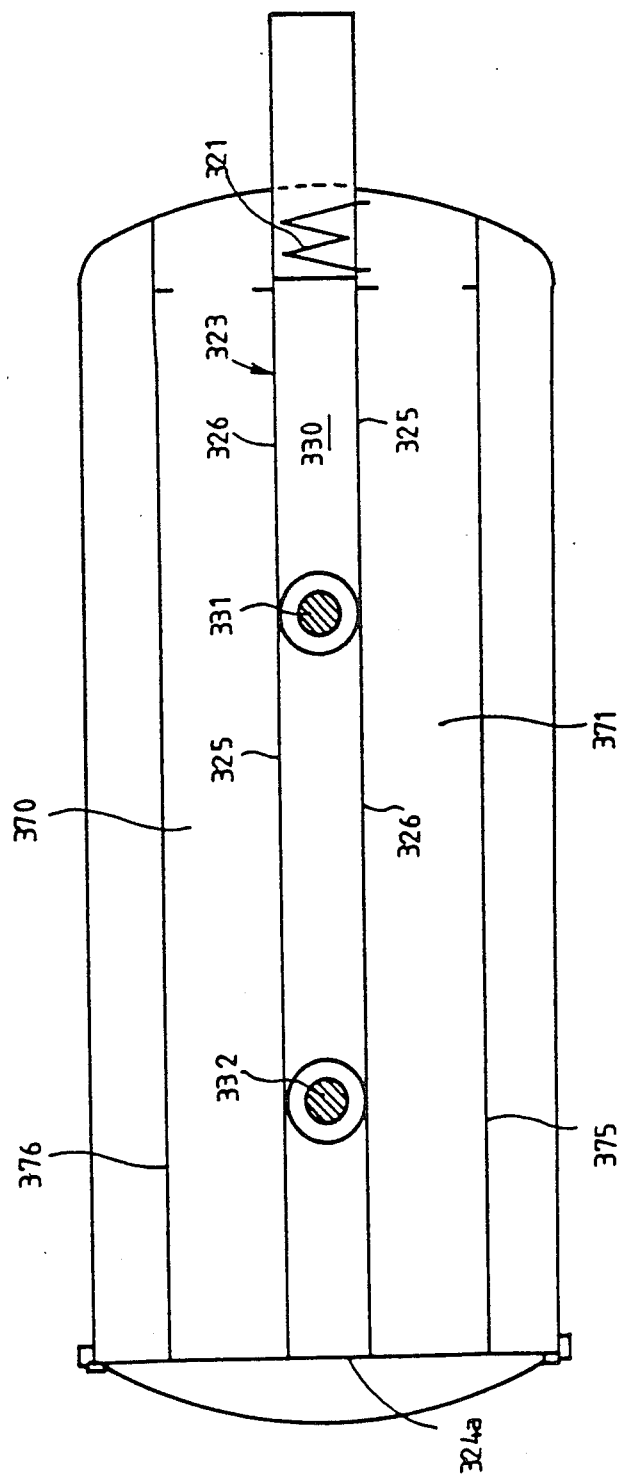
FIG. 37 is a schematical sectional view through a horizontal median plane, some parts having been removed for the sake of clarity.

As shown in FIGS. 35 and 37, duct 323 is defined by parallel longitudinal side walls 325 and 326, the bottom 327 of tank 310 adjacent its lower generatrix and a wall 330, substantially horizontal, formed, in the embodiment described and shown, with two orifices 331 and 332 provided for connection to bath distribution boxes 341, 342, respectively, of two material carriers $P_1$, $P_2$. This number of material-carriers is however that which corresponds to the embodiment of an autoclave 4 m long and 1.85m in diameter for the simultaneous treatment of 480 reels of yarn representing about 720 kg of material.

In other embodiments, not shown, the autoclave may be adapted for receiving more material-carriers, in number corresponding in fact to the number of orifices 331 and 332 formed in duct 323 and to which also corresponds that of the pressing devices $341_1$, $341_2$, each associated with a material carrier and provided at the top part of the tank, substantially straight above orifices 331, 332, these pressing devices, for immobilizing the material-carriers $P_1$ and $P_2$ in position in the autoclave are also adapted so that, when they are actuated, they provided sealing of the bath distributing boxes 340 of the material-carriers $P_1$ and $P_2$ through connection stubs 345 and 346 for the intake and/or discharge of treatment fluid into or from boxes 340, respectively, with interpositioning of sealing means such as 342 and 343.

Figure 38:
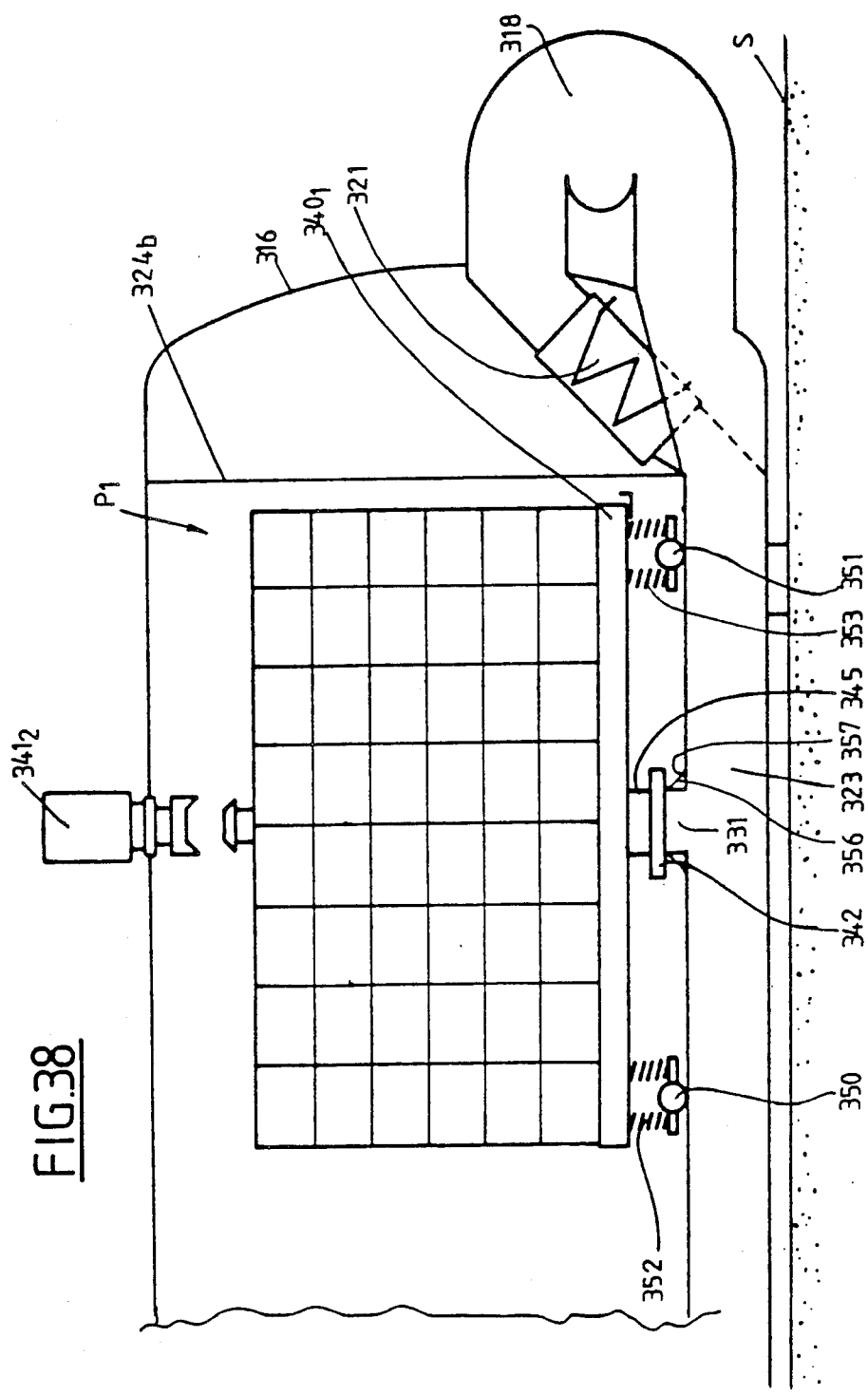
FIG. 38 is a schematical partial view similar to that of FIG. 34 and for a first type of material-carrier.

In a first embodiment, FIG. 38, each material-carrier P is provided with wheels 350 and 351 for moving over the floor of the autoclave with spring devices 352 and 353, respectively, which, when a pressing device 341 is actuated, make the sealing means 342 or 343 operative, the bath distribution box 340 of the material-carrier $P_1$ including a connection stub 345 for connection to duct 323 which has a tapered fitting, as shown at 356, for cooperating with a ring with mating tapered surface 357 which is fitted into the orifice 331 of duct 323.

In a second embodiment, the material-carriers P are loaded into the autoclave by means of a wire-guided carriage not shown, and a remote controlled shuttle on which the material carrier rests and which moves over the floor of the autoclave by means of wheels.

Figure 50:
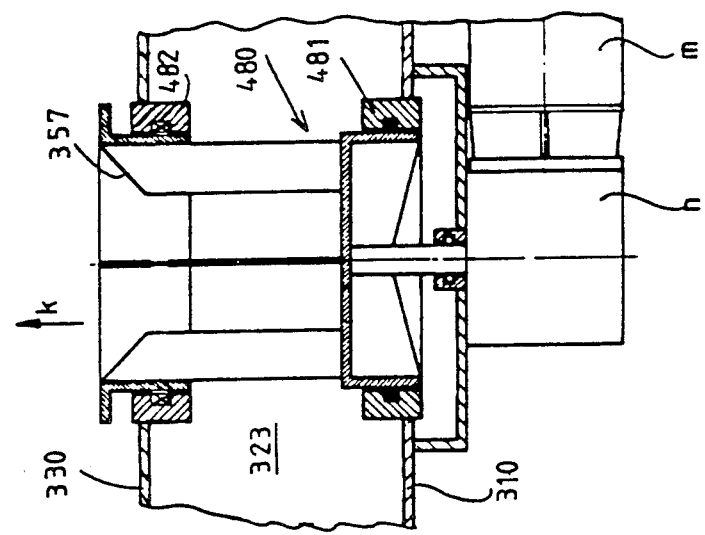
FIG. 50 shows a means for connecting a material-carrier of an improved autoclave of the invention to the treatment fluid circuit.

In a preferred embodiment of the autoclave of the invention, the connection of duct 323 to the material-carriers is provided by means of mobile connections 480, FIG. 50, sealingly mounted in said duct by means 481 and 482 associated with tank 310 and with the wall 330 respectively. Said connections, adapted to be set in motion in the direction of arrow k by a motor m and a coupling N housed under the tank 310, are thus able to cooperate by their tapered surface 357 with the mating surface of the connection stub of the material carrier P.

In the embodiment illustrated in FIGS. 34 to 37, the treatment fluid, for example a dyeing liquid bath, flows in one direction through duct 323 or duct 360 and in the opposite direction in one or more channels 370 and 371 so as to form a closed loop circuit. As best shown in FIGS. 35, 36 and 37, said channels disposed adjacent duct 323 are defined by the longitudinal walls 325, 326 and the horizontal wall 330 of said duct, by the lower part of the tank 310 on each side of said longitudinal walls 325, 326 and by the facing surfaces of those which have just been described of the material carriers and/or of the tank.

In a particular preferred and advantageous embodiment, said surfaces comprise two longitudinal dividing walls 375 and 376 extending from one end to the other of the autoclave, parallel to the mean vertical plane thereof and spaced apart by a distance slightly greater than the width of the material-carriers or similar which the autoclave is intended to receive, thus defining two dead volumes 377 and 378, FIG. 35, which make possible a considerable reduction in the bath ratio used.

It is the same result which is obtained when volumes 377 and 378 are formed by inert bodies made from a cellular material, in a block or with recesses, for example from a plastic material foam and whose flat facing faces are treated so as to withstand the temperatures and pressures reigning in the autoclave whose heat insulation they insure simultaneously from the inside.

With such an autoclave structure, the flow of the treatment fluid may take place as illustrated schematically in FIG. 36, that is to say from duct 323 in the connection stubs 345 and 346, through materials M (arrows f on the right hand part of this Fig.) then between said materials and the walls 375, 376 (or the facing faces of the equivalent inert bodies) or the door 315 (arrows g in FIG. 35 and in the left hand part of FIG. 36) as far as the lateral channels 370 and 371 from where the treatment fluid is driven by the turbine 318 through pipe 319 and recycled into the median duct 323, etc.

The structure of the autoclave also makes possible the reverse mode operation, that is to say the distribution of the treatment fluid from the lateral channels 370 and 371 and return through the median duct 323, that is to say, for example in the case where the materials M are reels of yarn B, flow from the outside towards the inside of the reels.

Whatever the mode of operation used, the improved autoclave of the invention makes treatment possible with the whole of material M totally immersed, if the bath level is chosen at $N_0$, FIG. 35, or in a non immersed mode, if said level is chosen at $N_1$, or else with materials partially immersed if the level is chosen between $N_0$ and $N_1$ for example as shown at $N_2$ in FIG. 35. In all the operating modes the distribution and return means for the treatment fluid of the invention make it possible to obtain, besides a small or very small bath ratio, a well balanced flow of said bath, not only for distribution but also for the return.

Figure 39:
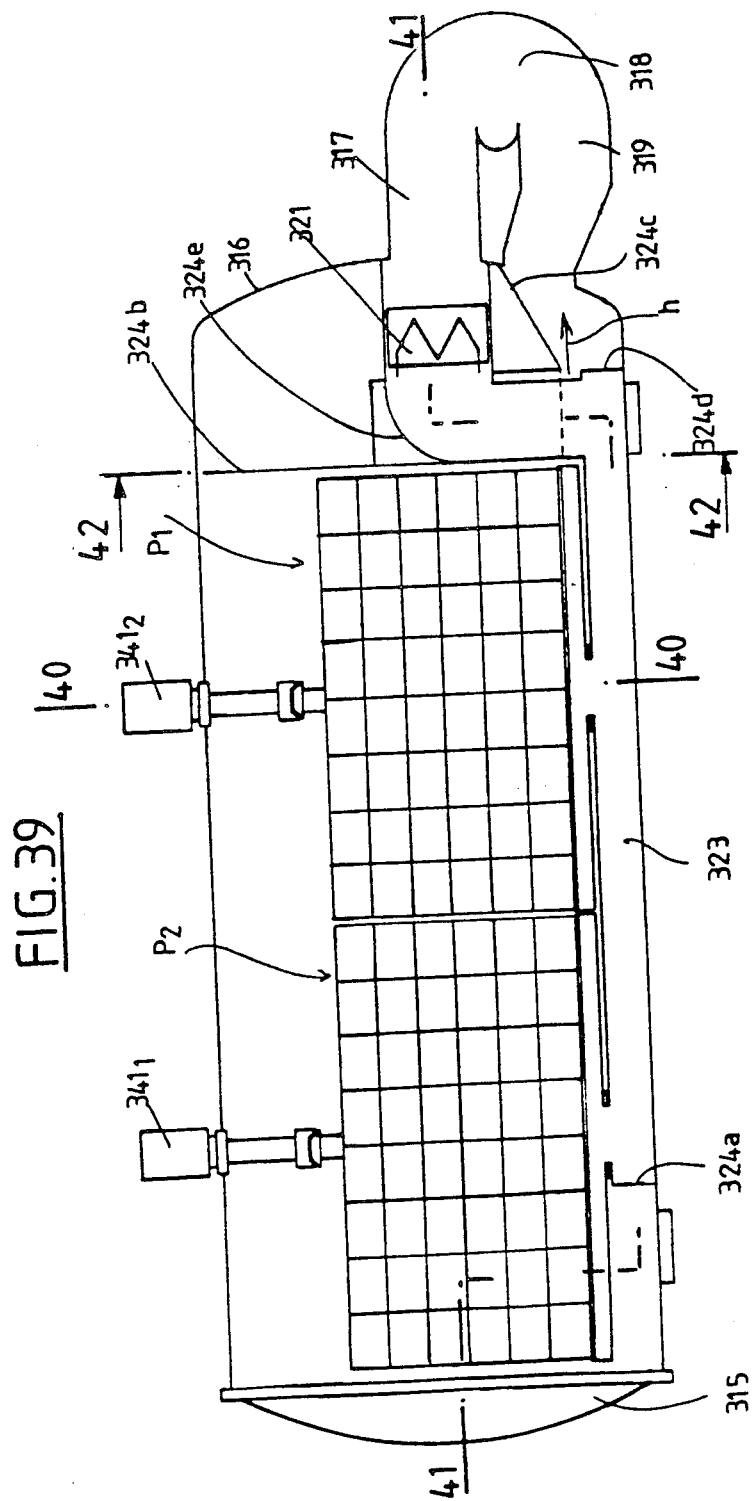
FIG. 39 is a view similar to that of FIG. 34 but another embodiment.
Figure 41:
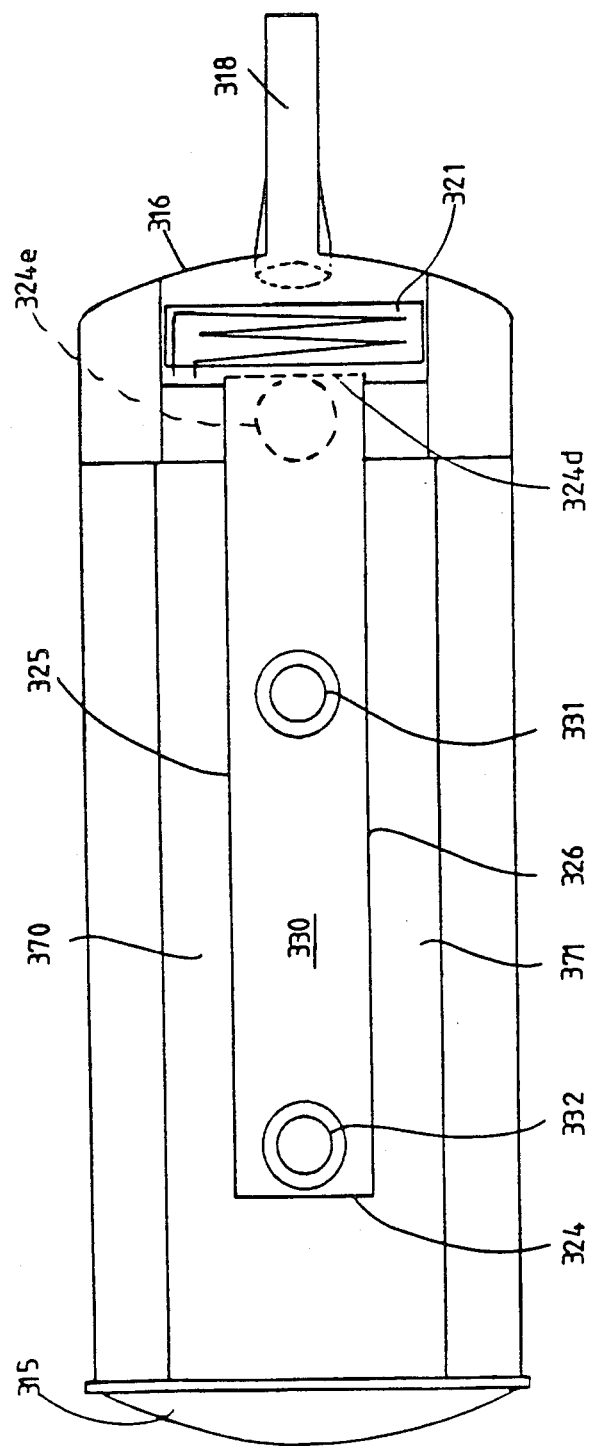
FIG. 41 is a schematical sectional view through the broken line 41—41 of FIG. 39.
Figure 42:
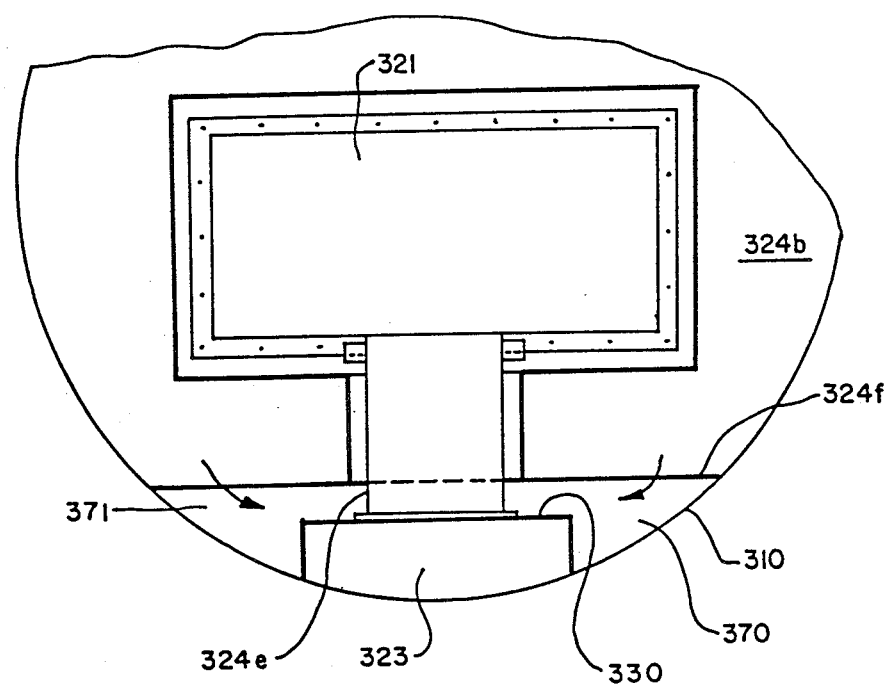
FIG. 42 is a partial sectional view through line 42—42 of FIG. 39 and on a larger scale.

Whereas, in the embodiment which has just been described, with the lateral channels 370 and 371 there are associated perforated plates, grids or similar 380 which extend between the longitudinal walls 325 and 326 of the median duct and tank 310, in another embodiment, as shown in FIGS. 39, 41 and 42, the presence of these plates or grids is not necessary. In such an embodiment, for the rest similar to that described above and whose common constituent parts bear the same references, in the vicinity of the longitudinal walls 325 and 326 defining the median duct 323, rails 382 and 383 are provided for guiding the material carriers P in the autoclave and which are thus placed in the lateral flow channels 370 and 371 for the treatment fluid. In a preferred embodiment, duct 323 is closed at its rear end by a wall 324d and the treatment fluid is introduced into said duct through a spout 342e connected to a sealed box of the heat exchanger 321. In this embodiment, wall 324b has its lower edge 324f which stops at a certain distance from wall 330 and the space defined between this edge, the bottom of tank 310 and the walls of said duct 323 then forms the connection of channels 370, 371 to pipe 319 when these channels serve for returning the treatment bath, which flows as shown by arrow h while being guided by a deflecting and separating plate 324c placed under the exchanger 321.

Figure 43:
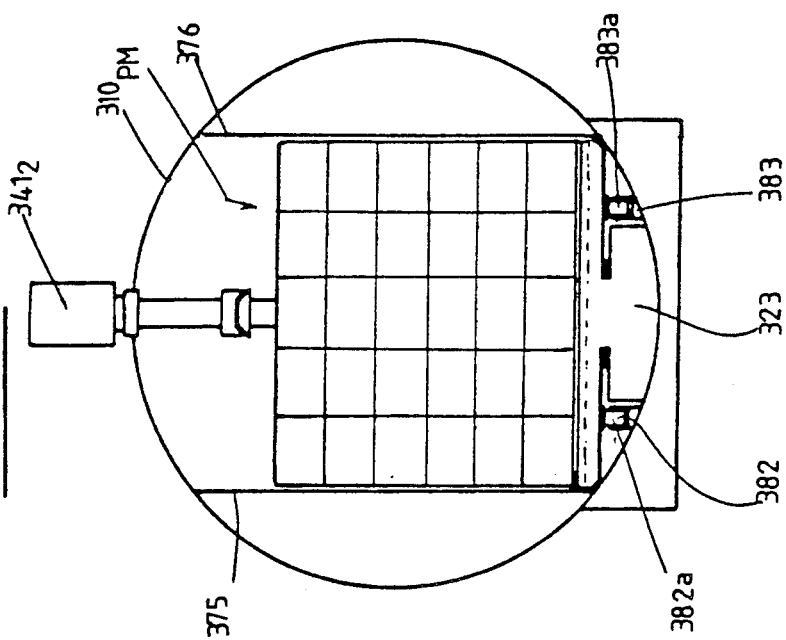
FIG. 43 is a view similar to that of FIG. 40 but for a variant.

In the embodiment illustrated schematically in FIG. 43, the structure of the autoclave is similar to that of the preceding embodiment, except that the guide rails are provided with rollers 382a and 383a, respectively, on which material carriers PM with a substantially flat bottom may be moved, the connection to the connection stubs such as 345 which they comprise then being advantageously provided by the connections as described above with reference to FIG. 50.

Figure 44:
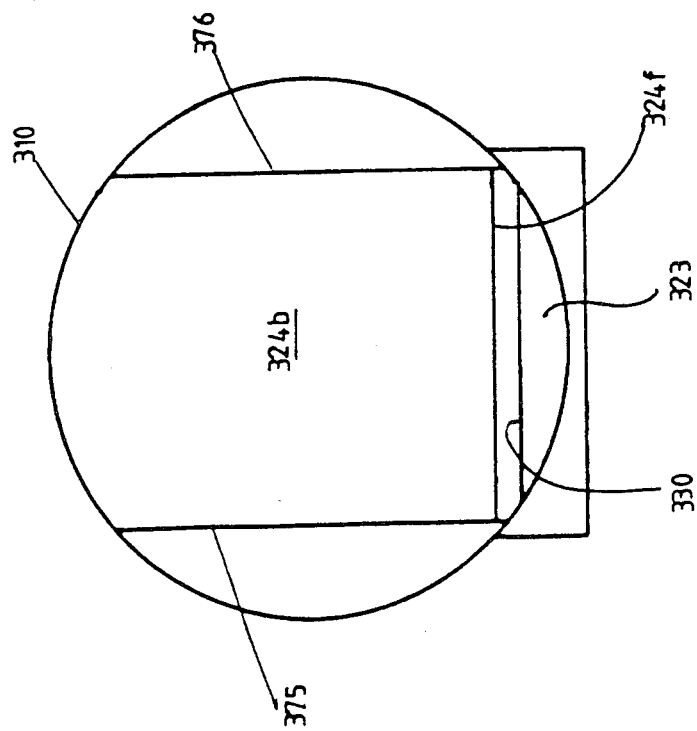
FIG. 44 is a view similar to the two preceding ones but for another variant, and very schematical.

In the embodiment illustrated very schematically in FIG. 44, the structure is similar to that of the preceding embodiment, except that the median duct 323 has here a cross section in the form of a circular segment, the flow of the treatment fluid, in the reverse direction to that existing in the median duct, taking place above said duct.

Figure 40:
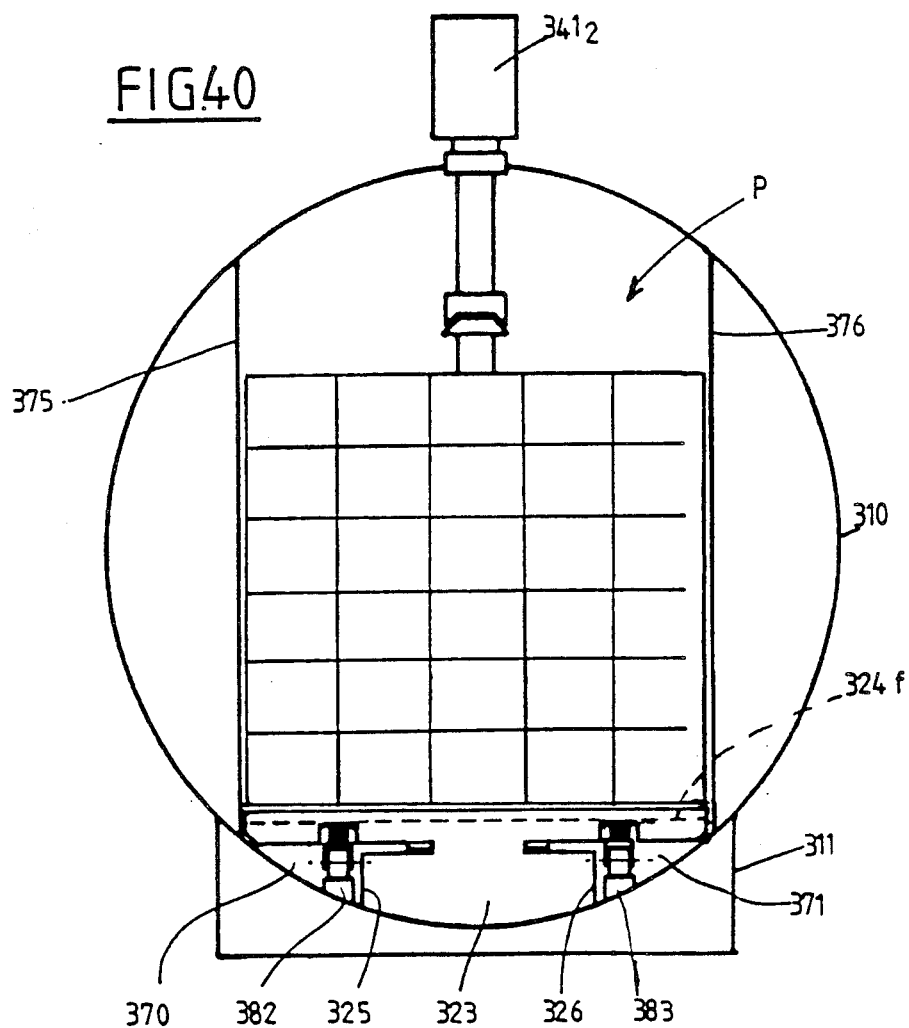
FIG. 40 is a sectional view through line 40—40 of FIG. 39 but on a larger scale.
Figure 45:
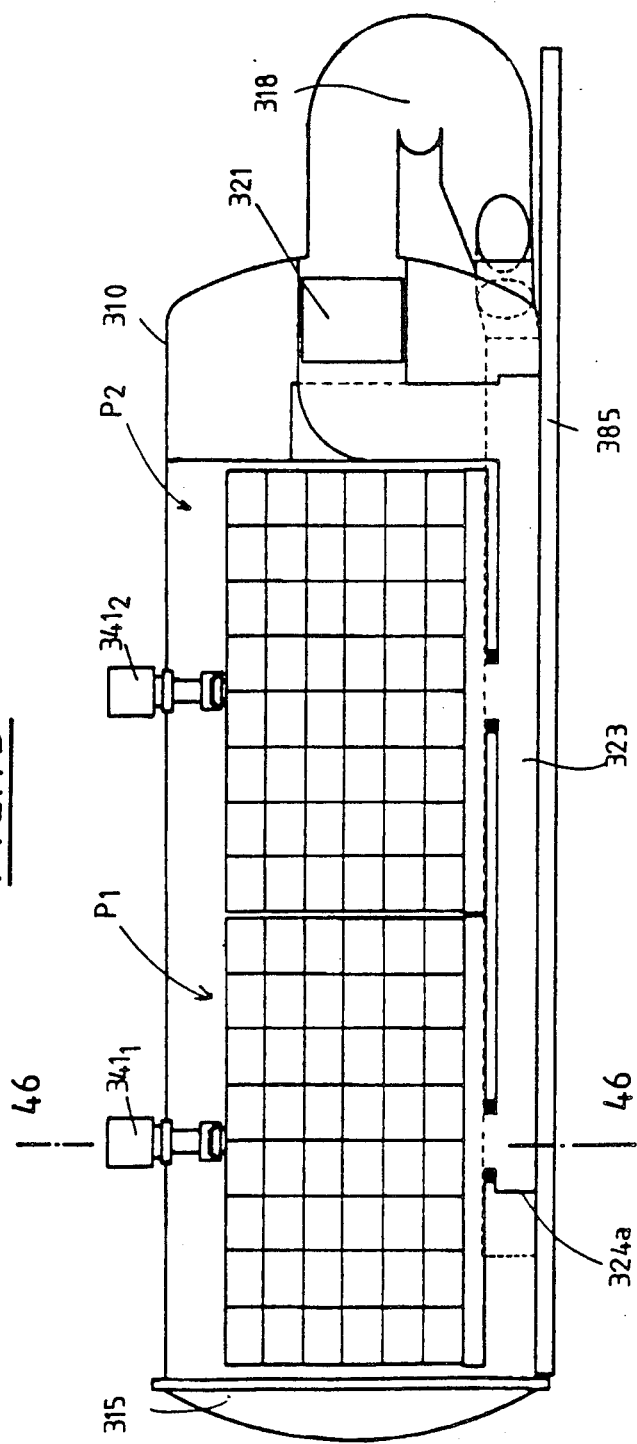
FIGS. 45 and 46 are views similar to FIGS. 34 and 35 but for another embodiment.
Figure 46:
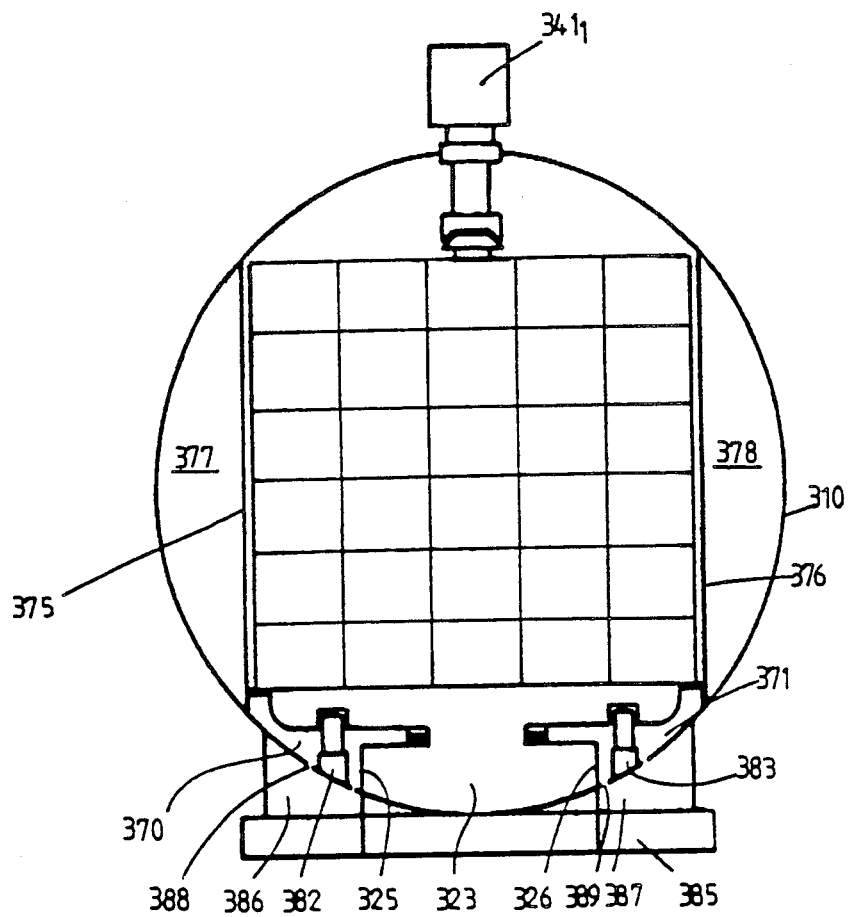

In the embodiment shown in FIGS. 45 and 46, it is a structure similar to that described with reference to FIGS. 39 to 41 which is presented. In this embodiment, however, tank 310 forming the external casing of the autoclave does not stand on the ground on feet but through a frame 385 which extends substantially from one end to the other of the apparatus. In this latter, where the same reference figures designate parts similar to those of the previous embodiment, rails such as 382 and 383 provided outside the median duct 323 and adjacent the longitudinal walls 325 and 326 are also placed in the lateral channels 370 and 371. But these latter, instead of being limited by tank 310, communicate through apertures such as 388 and 389, FIG. 46, with chambers 386 and 387 disposed below the tank, between this latter and the frame 385.

Thus, without increasing the overall size, the space may be advantageously used for increasing the passage section of said channels and matching it with that of the median duct 323.

Figure 47:
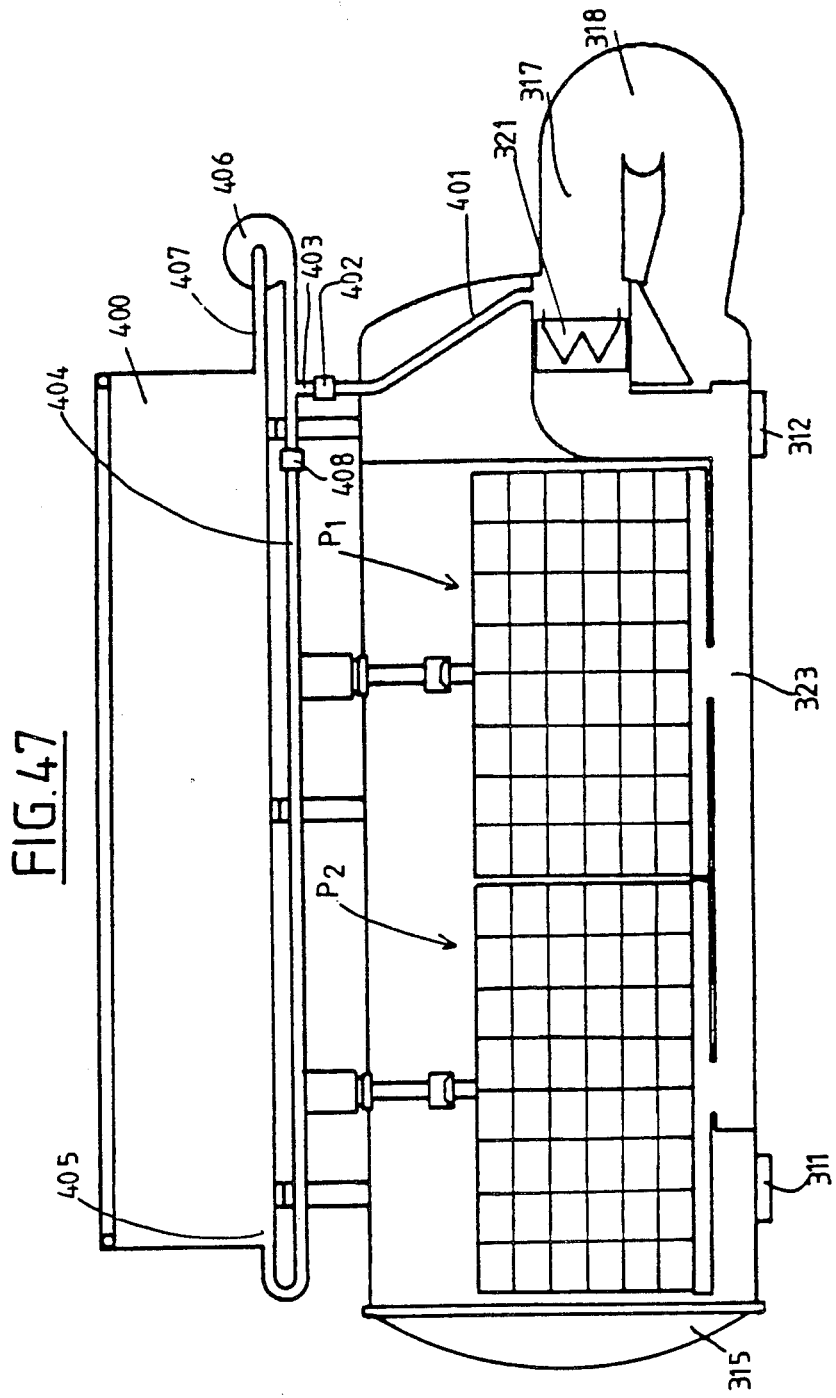
FIG. 47 is a view of yet another embodiment of an improved autoclave for the installation of the invention.

In the embodiment of FIG. 47, a container 400 for preparing the treatment bath is disposed above the autoclave which stands directly on the ground on its feet 311 and 312. For the construction of a particularly compact and integrated assembly, in this embodiment, container 400 is connected to pipe 317 of turbine 318 by a duct 401 in which is inserted a valve 402. This latter is also connected by a connection 403 to a duct 404 which, at one of its ends, opens into the bottom 405 of the container and which, at is other end, is connected to a pump 406, it also being connected to the bottom of container 400 by a pipe 407 but at the end opposite that at which duct 404 is connected. In this latter there is also inserted a valve 408, between the pump 406 and its connection to container 404. In such a construction, pump 406 operates as a transfer pump for recycling bath into the container, and for receiving bath from the autoclave as well, if required as high speed emptying pump.

Figure 48:
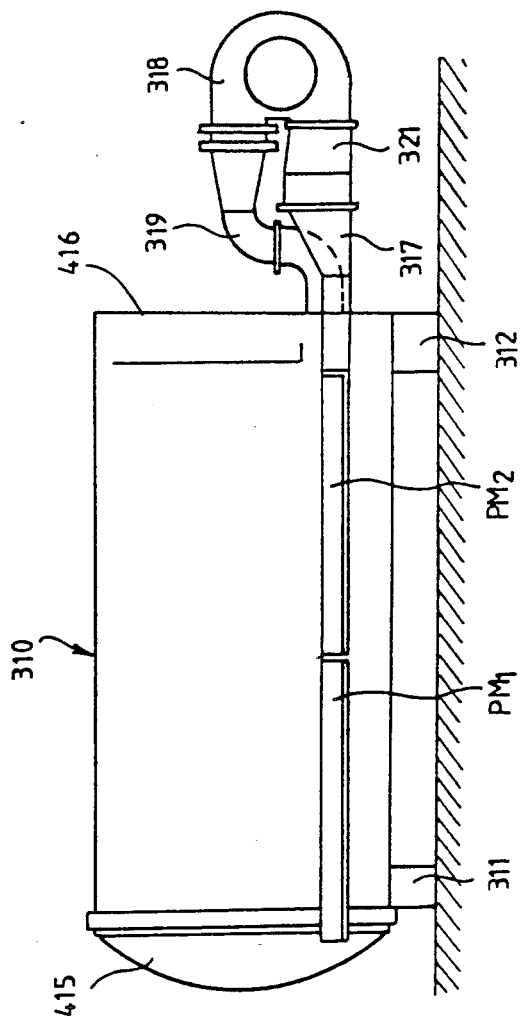
FIGS. 48 and 49 illustrate another embodiment of an improved autoclave of the invention.
Figure 49:
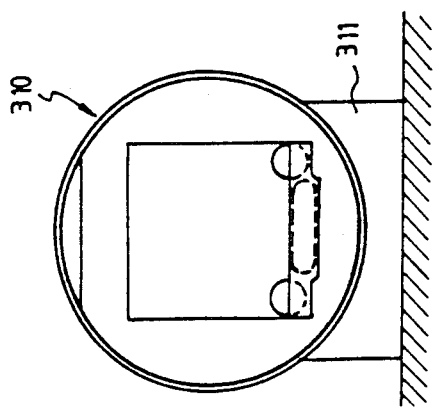

In the embodiment shown in FIGS. 48 and 49, tank 310, which stands on the ground on its feet 311 and 312 has a cylindrical cross section but has one end closed by a flat wall 416 and the other by a door 415. The tank is adapted for receiving material carriers $PM_1$ and $PM_2$ fed with treatment fluid by means of an apparatus of the type shown in FIGS. 10 to 12, that is to say with pump or turbine 318 provided between a pipe 317 and a pipe 319 which are both connected to the low part of the tank, with a heat exchanger 321 provided in pipe 317.

An installation in accordance with the invention makes it possible to practice all the usual types of wet treatment, for example treatments with unidirectional flow of the bath or treatments with alternating flow of the bath, with or without static pressure provided by a compressed gas above the bath, depending on the materials treated and the desired results.

Figure 51:
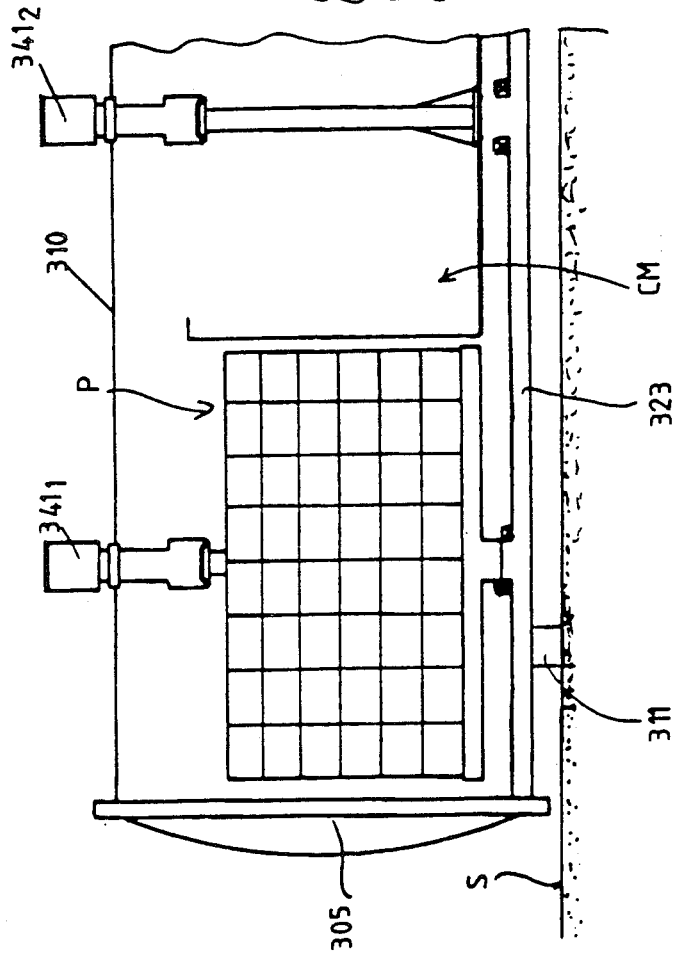
FIG. 51 illustrates a method of using the autoclave of an improved installation in accordance with the invention.

Thus, for example, the autoclave of the installation of the invention may be used at reduced capacity, as illustrated schematically in FIG. 51. In such a method of use, it is loaded not only with a material carrier $P_1$, but in addition with an inert body CM, for example an empty skein carrier, held in position by the immobilization device $341_2$ and not connected to the treatment fluid circuit.

As a variant, the material-carrier is a skein carrier which, having a parallelepipedic contour like the autoclave, makes it possible to use rectilinear "rods" for supporting the skeins.

What is claimed is:

1. An installation for the wet treatment of textile materials disposed on material-carriers, comprising a tank with a substantially horizontal axis defined by a floor, a ceiling and interconnecting sidewalls, said tank having at least one end provided with a door for inserting and removing at least one material-carrier on which the textile materials to be treated are loaded, means for causing a treatment fluid to flow in a closed loop through said textile materials along either a first or second direction, said fluid flow means further including means for bringing the treatment fluid to the desired temperature and at least first and second pipes, said at least one material-carrier including a box shaped base having at least one aperture for connection to said first pipe of said fluid flow means, said box shaped base opening into said textile material so as to form a first flow path of the treatment fluid in one direction, the flow of said treatment fluid in the other direction following a second path which includes at least said second pipe of said fluid flow means, said second pipe opening into a treatment volume defined by the interior of said tank and said textile material, wherein said first and second paths pass through said treatment volume through one or more passages formed in the vicinity of the floor of the tank.

2. The installation as claimed in claim 1, wherein said passages are formed at the longitudinal end of the tank opposite that in which the door is provided for loading or unloading said at least one material carrier.

3. The installation as claimed in claim 1 wherein said passages are formed in a wall at the longitudinal end of the tank opposite the one in which the door is provided for loading or unloading said at least one material-carrier and in the side walls of the tank.

4. The installation as claimed in claim 1 wherein said passages are formed in a wall at the longitudinal end of the tank opposite the one in which the door is provided for loading or unloading said at least one material-carrier and in the floor of the tank.

5. The installation as claimed in claim 1 wherein said passages are formed solely in the floor of the tank.

6. The installation as claimed in claim 1 wherein said passages are formed in the floor and in the side walls of the tank.

7. The installation as claimed in claim 1 wherein said tank has a generally parallelepipedic shape, with a quadrangular cross section and an area corresponding substantially to that of the loaded material-carriers, so that the bath ratio used in such an installation is about 1:3 or less.

8. The installation as claimed in claim 1 further including means for placing said tank under the static pressure by the introduction compressed air or an inert gas into said tank.

9. The installation as claimed in claim 1 wherein the textile materials to be treated are reels, floss or twisted cord or worsted ribbons or skeins of yarn disposed vertically or horizontally and, in the case of reels, they are supported by bayonets or manifolds fixed to a box disposed horizontally or vertically in the tank or to a return of the box shaped base of the material carried, which return is also disposed vertically.

10. The installation as claimed in claim 1 wherein said tank is provided with stiffeners with a portion of predetermined ones serving as a support, on the ground, for the tank.

11. The installation as claimed in claim 10 further including a bath preparation assembly operatively connected to the tank.

12. The installation as in claim 11 wherein said bath preparation assembly is mounted on top of said tank.

13. The installation as claimed in claim 10 wherein said at least one material-carrier includes spaced apart tracks on a bottom surface thereof and the floor of said tank is provided with rolling means for cooperating with said tracks during movement of said at least one material-carrier relative to the tank.

14. The installation as claimed in claim 10 wherein said door is of the pivoting or shutter type, said door being controlled in cooperation with a device for locking said at least one material-carrier in the tank and for providing sealed continuity of the first and second fluid flow paths.

15. The installation as claimed in claim 10 further including a third pipe associated with said tank for setting the fluid in motion along a third flow path, said third pipe opening directly into the tank, said third flow path further including valves for establishing the appropriate fluid flow for the textile materials being treated.

16. The installation as claimed in claim 15 wherein the tank comprises, for the fluid flow in one direction, a longitudinal median duct to which said at least one material-carrier is housed in the tank is operatively connected, said median duct extending substantially in the median plane and in the bottom of said tank, and, for fluid flow in the other direction, said tank including means defining at least one longitudinal channel which extends in the tank adjacent said median duct.

17. The installation as claimed in claim 16 wherein for the connection of the median longitudinal duct to said at least one material-carrier, for the passage of the treatment fluid, is provided by a plurality of orifices formed in a wall defining said median duct and to each of which may be connected, with interpositioning of sealing means, a connecting stub.

18. Installation as claimed in claim 15 wherein said longitudinal median duct for flow of the fluid in one direction has a cross section in the form of a circular section and fluid flow in the other direction takes place above said median duct.

19. A material carrier adapted for use in an installation for the wet treatment of textiles and materials as claimed in any one of the preceding claims, comprising a base with rectangular contour in the form of a box with solid bottom and at least one opening in its periphery and/or its bottom for the intake or discharge of the treatment fluid as well as rolling tracks, on the longitudinal edges of is bottom, adapted for cooperating with matching means formed on the floor of the tank for the loading and/or unloading of the material-carriers into and/or out of said tank or said autoclave.

20. The material carrier as claimed in claim 19, comprising floss or twisted cord support means or means for supporting skeins of yarn on rectilinear rods.

21. The material carrier as claimed in claim 19 comprising an inert body secured to its box, advantageously a closed inert body withstanding the pressure.

22. The installation as in claim 1 wherein the textile material is in the form of reels and the installation further includes means for supporting the reels within said tank.

23. The installation as in claim 1 wherein the textile material is in the form of yarn and the installation further includes means for supporting the yarn within said tank.

* * * * *